(12) United States Patent
Cisler et al.

(10) Patent No.: US 9,009,115 B2
(45) Date of Patent: Apr. 14, 2015

(54) RESTORING ELECTRONIC INFORMATION

(75) Inventors: Pavel Cisler, Los Gatos, CA (US);
Robert Ulrich, San Jose, CA (US);
Dave Lyons, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/499,867

(22) Filed: Aug. 4, 2006

(65) Prior Publication Data
US 2008/0034011 A1 Feb. 7, 2008

(51) Int. Cl.
| G06F 7/00 | (2006.01) |
| G06F 17/00 | (2006.01) |
| G06F 17/30 | (2006.01) |
| G06F 11/14 | (2006.01) |

(52) U.S. Cl.
CPC ...... *G06F 17/30053* (2013.01); *G06F 11/1469* (2013.01); *G06F 2201/84* (2013.01)

(58) Field of Classification Search
USPC .................. 707/202–204, 999.202–999.204, 707/674–681, 657; 715/229; 711/161–162
See application file for complete search history.

(56) References Cited

U.S. PATENT DOCUMENTS

| 5,150,407 A | 9/1992 | Chan |
| 5,150,473 A | 9/1992 | Zulch |
| 5,163,148 A | 11/1992 | Walls |
| 5,276,867 A | 1/1994 | Kenley et al. |
| 5,349,658 A | 9/1994 | O'Rourke et al. |
| 5,369,570 A | 11/1994 | Parad |
| 5,659,614 A | 8/1997 | Bailey |
| 5,664,186 A | 9/1997 | Bennett et al. |
| 5,680,562 A | 10/1997 | Conrad et al. |
| 5,736,974 A | 4/1998 | Selker |
| 5,745,669 A | 4/1998 | Hugard et al. |
| 5,754,178 A | 5/1998 | Johnston et al. |
| 5,758,359 A | 5/1998 | Saxon |
| 5,790,120 A | 8/1998 | Lozares et al. |
| 5,802,175 A | 9/1998 | Kara |
| 5,818,936 A | 10/1998 | Mashayekhi |
| 5,819,032 A | 10/1998 | De Vries et al. |
| 5,819,292 A | 10/1998 | Hitz et al. |
| 5,831,617 A | 11/1998 | Bhukhanwala |
| 5,832,526 A | 11/1998 | Schuyler |

(Continued)

FOREIGN PATENT DOCUMENTS

| EP | 0629950 | 12/1994 |
| EP | 1152352 | 11/2001 |

(Continued)

OTHER PUBLICATIONS

"What's New in Word 2002." Wellesly College Information Services Computing Documentation. Jan. 2002. http://www.wellesley.edu/Computing/Office02/Word02/word02.html. Accessed Aug. 12, 2008.*

(Continued)

*Primary Examiner* — Uyen Le

(74) *Attorney, Agent, or Firm* — Fish & Richardson P.C.

(57) ABSTRACT

Systems and methods are provided for automatic detection of data loss to system or a particular application. In one implementation a method is provided. The method includes identifying a loss of data associated with a current view. An alert is generated identifying the loss of data. A user is prompted to initiate a history view to restore the lost data, the history view including at least a first visual representation of an earlier version of the current view.

29 Claims, 12 Drawing Sheets

(56) References Cited

U.S. PATENT DOCUMENTS

| | | |
|---|---|---|
| 5,961,605 A | 10/1999 | Deng et al. |
| 5,987,566 A | 11/1999 | Vishlitzky et al. |
| 6,006,227 A | 12/1999 | Freeman et al. |
| 6,023,506 A | 2/2000 | Ote et al. |
| 6,097,313 A | 8/2000 | Takahashi et al. |
| 6,112,318 A | 8/2000 | Jouppi et al. |
| 6,134,660 A | 10/2000 | Boneh et al. |
| 6,167,532 A | 12/2000 | Wisecup |
| 6,188,405 B1 | 2/2001 | Czerwinski et al. |
| 6,269,381 B1 | 7/2001 | St. Pierre et al. |
| 6,366,988 B1 * | 4/2002 | Skiba et al. ............... 711/165 |
| 6,396,500 B1 | 5/2002 | Qureshi et al. |
| 6,397,308 B1 | 5/2002 | Ofek et al. |
| 6,424,626 B1 | 7/2002 | Kidambi et al. |
| 6,460,055 B1 | 10/2002 | Midgley et al. |
| 6,553,392 B1 | 4/2003 | Mosher, Jr. et al. |
| 6,574,733 B1 | 6/2003 | Langford |
| 6,604,118 B2 | 8/2003 | Kleiman et al. |
| 6,625,704 B2 | 9/2003 | Winokur |
| 6,629,129 B1 | 9/2003 | Bookspan et al. |
| 6,636,937 B2 | 10/2003 | Peter |
| 6,638,313 B1 | 10/2003 | Freeman et al. |
| 6,701,454 B1 | 3/2004 | Fischer et al. |
| 6,711,572 B2 | 3/2004 | Zakharov et al. |
| 6,714,201 B1 | 3/2004 | Grinstein et al. |
| 6,714,952 B2 | 3/2004 | Dunham et al. |
| 6,725,427 B2 | 4/2004 | Freeman et al. |
| 6,728,735 B1 | 4/2004 | Fong |
| 6,768,999 B2 | 7/2004 | Prager et al. |
| 6,785,751 B1 | 8/2004 | Connor |
| 6,785,786 B1 | 8/2004 | Gold et al. |
| 6,801,229 B1 | 10/2004 | Tinkler |
| 6,836,657 B2 | 12/2004 | Ji et al. |
| 6,857,001 B2 | 2/2005 | Hitz et al. |
| 6,892,211 B2 | 5/2005 | Hitz et al. |
| 6,901,493 B1 | 5/2005 | Maffezzoni |
| 6,918,124 B1 | 7/2005 | Novik et al. |
| 6,947,556 B1 | 9/2005 | Matyas et al. |
| 6,948,039 B2 | 9/2005 | Biessener et al. |
| 6,959,368 B1 | 10/2005 | St. Pierre et al. |
| 6,993,710 B1 | 1/2006 | Coad et al. |
| 7,069,402 B2 | 6/2006 | Coulter et al. |
| 7,072,916 B1 | 7/2006 | Lewis et al. |
| 7,099,900 B1 | 8/2006 | Bromley et al. |
| 7,103,740 B1 | 9/2006 | Colgrove et al. |
| 7,107,527 B2 | 9/2006 | Takahashi et al. |
| 7,111,136 B2 | 9/2006 | Yamagami |
| 7,133,902 B2 | 11/2006 | Saha et al. |
| 7,134,026 B2 | 11/2006 | Horiuchi et al. |
| 7,155,486 B2 | 12/2006 | Aoshima et al. |
| 7,174,352 B2 | 2/2007 | Kleiman et al. |
| 7,185,028 B2 | 2/2007 | Lechner |
| 7,200,617 B2 | 4/2007 | Kibuse |
| 7,222,194 B2 | 5/2007 | Kano et al. |
| 7,257,717 B2 | 8/2007 | Huang |
| 7,275,075 B2 | 9/2007 | Cannon |
| 7,284,190 B2 | 10/2007 | Chellis et al. |
| 7,289,973 B2 | 10/2007 | Kiessig et al. |
| 7,318,134 B1 | 1/2008 | Oliveira et al. |
| 7,320,076 B2 | 1/2008 | Caronni |
| 7,386,801 B1 | 6/2008 | Horvitz et al. |
| 7,401,194 B2 | 7/2008 | Jewell |
| 7,418,619 B1 * | 8/2008 | Uhlmann et al. ............... 714/2 |
| 7,434,164 B2 | 10/2008 | Salesin et al. |
| 7,434,177 B1 | 10/2008 | Ording et al. |
| 7,440,125 B2 | 10/2008 | Maekawa et al. |
| 7,483,693 B2 | 1/2009 | Lueng et al. |
| 7,505,762 B2 | 3/2009 | Onyon et al. |
| 7,518,611 B2 | 4/2009 | Boyd et al. |
| 7,558,930 B2 | 7/2009 | Kitamura et al. |
| 7,559,016 B1 | 7/2009 | Rakowski et al. |
| 7,574,459 B2 | 8/2009 | Sen et al. |
| 7,590,668 B2 | 9/2009 | Kathuria et al. |
| 7,596,586 B2 | 9/2009 | Gokhale et al. |
| 7,600,133 B2 | 10/2009 | Long et al. |
| 7,620,670 B2 | 11/2009 | Tokuda et al. |
| 7,624,133 B1 | 11/2009 | Ojalvo |
| 7,630,021 B2 | 12/2009 | Matsuzaka et al. |
| 7,657,450 B2 | 2/2010 | Amit et al. |
| 7,660,817 B2 * | 2/2010 | Smith et al. ............. 707/999.103 |
| 7,669,141 B1 | 2/2010 | Pegg |
| 7,676,689 B1 | 3/2010 | Shioyama et al. |
| 7,711,771 B2 | 5/2010 | Kirnos |
| 7,734,594 B2 | 6/2010 | Wang |
| 7,739,464 B1 | 6/2010 | Coulter et al. |
| 7,761,456 B1 | 7/2010 | Cram et al. |
| 7,809,687 B2 | 10/2010 | Cisler et al. |
| 7,809,688 B2 | 10/2010 | Cisler et al. |
| 7,836,311 B2 | 11/2010 | Kuriya et al. |
| 7,853,566 B2 | 12/2010 | Cisler et al. |
| 7,853,567 B2 | 12/2010 | Cisler et al. |
| 7,856,424 B2 | 12/2010 | Cisler et al. |
| 7,860,839 B2 | 12/2010 | Cisler et al. |
| 7,882,072 B1 | 2/2011 | Axe et al. |
| 7,890,527 B1 | 2/2011 | Nene et al. |
| 7,934,064 B1 | 4/2011 | Per et al. |
| 8,010,900 B2 | 8/2011 | Hart et al. |
| 8,024,292 B2 * | 9/2011 | Thompson et al. ............ 707/640 |
| 8,055,911 B2 | 11/2011 | Feng et al. |
| 8,099,392 B2 | 1/2012 | Paterson et al. |
| 8,166,415 B2 | 4/2012 | Cisler et al. |
| 8,209,308 B2 | 6/2012 | Rueben et al. |
| 8,229,897 B2 | 7/2012 | Cannon et al. |
| 8,245,078 B1 | 8/2012 | Chatterjee et al. |
| 8,260,770 B2 | 9/2012 | Bell et al. |
| 8,495,024 B2 | 7/2013 | Cisler et al. |
| 8,775,378 B2 | 7/2014 | Cisler et al. |
| 2001/0047368 A1 | 11/2001 | Oshinsky et al. |
| 2001/0055317 A1 | 12/2001 | Kajizaki et al. |
| 2002/0016912 A1 | 2/2002 | Johnson |
| 2002/0023198 A1 | 2/2002 | Kokubun et al. |
| 2002/0046220 A1 | 4/2002 | Freeman et al. |
| 2002/0049883 A1 | 4/2002 | Schneider et al. |
| 2002/0054158 A1 | 5/2002 | Asami |
| 2002/0063737 A1 | 5/2002 | Feig et al. |
| 2002/0065999 A1 | 5/2002 | Kikuchi et al. |
| 2002/0080180 A1 | 6/2002 | Mander et al. |
| 2002/0107886 A1 | 8/2002 | Gentner et al. |
| 2002/0112237 A1 | 8/2002 | Kelts |
| 2002/0120648 A1 | 8/2002 | Ball et al. |
| 2002/0156921 A1 | 10/2002 | Dutta et al. |
| 2002/0160760 A1 | 10/2002 | Aoyama |
| 2002/0174283 A1 | 11/2002 | Lin |
| 2003/0014521 A1 | 1/2003 | Elson et al. |
| 2003/0016248 A1 | 1/2003 | Hayes Ubillos |
| 2003/0018878 A1 | 1/2003 | Dorward et al. |
| 2003/0050940 A1 | 3/2003 | Robinson |
| 2003/0063128 A1 | 4/2003 | Salmimaa et al. |
| 2003/0065687 A1 | 4/2003 | Momiji et al. |
| 2003/0097640 A1 | 5/2003 | Abrams et al. |
| 2003/0122874 A1 | 7/2003 | Dieberger et al. |
| 2003/0126247 A1 | 7/2003 | Strasser et al. |
| 2003/0131007 A1 | 7/2003 | Schirmer et al. |
| 2003/0135650 A1 | 7/2003 | Kano et al. |
| 2003/0137540 A1 | 7/2003 | Klevenz et al. |
| 2003/0167380 A1 | 9/2003 | Green |
| 2003/0172937 A1 | 9/2003 | Faries et al. |
| 2003/0182332 A1 | 9/2003 | McBrearty et al. |
| 2003/0195903 A1 | 10/2003 | Manley et al. |
| 2003/0220949 A1 | 11/2003 | Witt et al. |
| 2004/0044707 A1 | 3/2004 | Richard |
| 2004/0066414 A1 * | 4/2004 | Czerwinski et al. .......... 345/781 |
| 2004/0073560 A1 | 4/2004 | Edwards |
| 2004/0078641 A1 | 4/2004 | Fleischmann |
| 2004/0088331 A1 | 5/2004 | Therrien et al. |
| 2004/0117459 A1 | 6/2004 | Fry |
| 2004/0125137 A1 | 7/2004 | Stata et al. |
| 2004/0133575 A1 | 7/2004 | Farmer et al. |
| 2004/0139396 A1 | 7/2004 | Gelernter et al. |
| 2004/0143652 A1 | 7/2004 | Grannan et al. |
| 2004/0163009 A1 | 8/2004 | Goldstein et al. |
| 2004/0167942 A1 * | 8/2004 | Oshinsky et al. ............. 707/204 |
| 2004/0175000 A1 | 9/2004 | Caronni |
| 2004/0193953 A1 | 9/2004 | Callahan et al. |

(56) References Cited

U.S. PATENT DOCUMENTS

| | | | |
|---|---|---|---|
| 2004/0199779 | A1 | 10/2004 | Huang |
| 2004/0199826 | A1 | 10/2004 | Bertram et al. |
| 2004/0210608 | A1 | 10/2004 | Lee et al. |
| 2004/0220965 | A1 | 11/2004 | Harville et al. |
| 2004/0220980 | A1* | 11/2004 | Forster ............ 707/204 |
| 2004/0228493 | A1 | 11/2004 | Ma |
| 2004/0230892 | A1 | 11/2004 | Horton |
| 2004/0235523 | A1 | 11/2004 | Schrire et al. |
| 2004/0236769 | A1* | 11/2004 | Smith et al. ............ 707/100 |
| 2004/0236916 | A1 | 11/2004 | Berkowitz et al. |
| 2004/0236958 | A1 | 11/2004 | Teicher et al. |
| 2004/0267700 | A1 | 12/2004 | Dumais et al. |
| 2005/0010955 | A1 | 1/2005 | Elia et al. |
| 2005/0071390 | A1 | 3/2005 | Midgley et al. |
| 2005/0091596 | A1 | 4/2005 | Anthony et al. |
| 2005/0102695 | A1* | 5/2005 | Musser, Jr. ............ 725/34 |
| 2005/0108253 | A1 | 5/2005 | Metsatahti et al. |
| 2005/0138013 | A1 | 6/2005 | Walker et al. |
| 2005/0138081 | A1 | 6/2005 | Alshab et al. |
| 2005/0144135 | A1* | 6/2005 | Juarez et al. ............ 705/51 |
| 2005/0149577 | A1 | 7/2005 | Okada et al. |
| 2005/0165867 | A1 | 7/2005 | Barton et al. |
| 2005/0187992 | A1 | 8/2005 | Prahlad et al. |
| 2005/0204186 | A1 | 9/2005 | Rothman et al. |
| 2005/0216520 | A1 | 9/2005 | He et al. |
| 2005/0216527 | A1 | 9/2005 | Erlingsson |
| 2005/0246398 | A1 | 11/2005 | Barzilai et al. |
| 2005/0262168 | A1 | 11/2005 | Helliker et al. |
| 2005/0262377 | A1 | 11/2005 | Sim-Tang |
| 2006/0026218 | A1 | 2/2006 | Urmston |
| 2006/0036568 | A1 | 2/2006 | Moore et al. |
| 2006/0041603 | A1 | 2/2006 | Paterson et al. |
| 2006/0041823 | A1 | 2/2006 | Wolfgang et al. |
| 2006/0053332 | A1 | 3/2006 | Uhlmann |
| 2006/0064444 | A1 | 3/2006 | Van Ingen et al. |
| 2006/0064634 | A1 | 3/2006 | Dettinger et al. |
| 2006/0080521 | A1 | 4/2006 | Barr et al. |
| 2006/0085792 | A1 | 4/2006 | Traut |
| 2006/0085817 | A1 | 4/2006 | Kim et al. |
| 2006/0088167 | A1 | 4/2006 | Bade et al. |
| 2006/0101384 | A1* | 5/2006 | Sim-Tang et al. ............ 717/104 |
| 2006/0106893 | A1 | 5/2006 | Daniels et al. |
| 2006/0117309 | A1 | 6/2006 | Singhal et al. |
| 2006/0129496 | A1 | 6/2006 | Chow et al. |
| 2006/0137010 | A1* | 6/2006 | Kramer et al. ............ 726/22 |
| 2006/0143250 | A1* | 6/2006 | Peterson et al. ............ 707/204 |
| 2006/0150107 | A1 | 7/2006 | Leung et al. |
| 2006/0156246 | A1 | 7/2006 | Williams et al. |
| 2006/0161861 | A1 | 7/2006 | Holecek et al. |
| 2006/0173848 | A1 | 8/2006 | Peterson et al. |
| 2006/0200754 | A1 | 9/2006 | Kablesh et al. |
| 2006/0218363 | A1 | 9/2006 | Palapudi |
| 2006/0224956 | A1 | 10/2006 | Storisteanu et al. |
| 2006/0235907 | A1 | 10/2006 | Kathuria et al. |
| 2006/0236406 | A1 | 10/2006 | Johnson |
| 2006/0248294 | A1 | 11/2006 | Nedved et al. |
| 2006/0253470 | A1 | 11/2006 | Friedman et al. |
| 2006/0288205 | A1 | 12/2006 | Linares |
| 2007/0027935 | A1 | 2/2007 | Haselton et al. |
| 2007/0030528 | A1 | 2/2007 | Quaeler et al. |
| 2007/0038884 | A1 | 2/2007 | Campbell et al. |
| 2007/0043715 | A1 | 2/2007 | Kaushik et al. |
| 2007/0043790 | A1 | 2/2007 | Kryger |
| 2007/0070066 | A1 | 3/2007 | Bakhash |
| 2007/0078910 | A1 | 4/2007 | Bopardikar |
| 2007/0088702 | A1 | 4/2007 | Fridella et al. |
| 2007/0094312 | A1 | 4/2007 | Sim-Tang |
| 2007/0106978 | A1 | 5/2007 | Felts |
| 2007/0136381 | A1 | 6/2007 | Cannon et al. |
| 2007/0136389 | A1 | 6/2007 | Bergant et al. |
| 2007/0136423 | A1 | 6/2007 | Gilmore et al. |
| 2007/0143425 | A1 | 6/2007 | Kieselbach et al. |
| 2007/0150326 | A1 | 6/2007 | Nakao et al. |
| 2007/0156772 | A1 | 7/2007 | Lechner |
| 2007/0168497 | A1 | 7/2007 | Locker et al. |
| 2007/0174580 | A1 | 7/2007 | Shulga |
| 2007/0180268 | A1 | 8/2007 | Filimon et al. |
| 2007/0185879 | A1 | 8/2007 | Roublev et al. |
| 2007/0185922 | A1 | 8/2007 | Kapoor et al. |
| 2007/0186127 | A1 | 8/2007 | Desai et al. |
| 2007/0192386 | A1 | 8/2007 | Fries et al. |
| 2007/0266007 | A1 | 11/2007 | Arrouye et al. |
| 2007/0271263 | A1 | 11/2007 | Merrild |
| 2007/0271303 | A1 | 11/2007 | Menendez et al. |
| 2007/0282854 | A1 | 12/2007 | Bhogal et al. |
| 2007/0288536 | A1 | 12/2007 | Sen et al. |
| 2008/0016576 | A1 | 1/2008 | Ueda et al. |
| 2008/0022393 | A1 | 1/2008 | Waltermann et al. |
| 2008/0028007 | A1 | 1/2008 | Ishii et al. |
| 2008/0033922 | A1 | 2/2008 | Cisler et al. |
| 2008/0033969 | A1 | 2/2008 | Koo et al. |
| 2008/0034004 | A1 | 2/2008 | Cisler et al. |
| 2008/0034011 | A1 | 2/2008 | Cisler et al. |
| 2008/0034013 | A1 | 2/2008 | Cisler et al. |
| 2008/0034016 | A1 | 2/2008 | Cisler et al. |
| 2008/0034017 | A1 | 2/2008 | Giampaolo et al. |
| 2008/0034018 | A1 | 2/2008 | Cisler et al. |
| 2008/0034019 | A1 | 2/2008 | Cisler et al. |
| 2008/0034039 | A1 | 2/2008 | Cisler et al. |
| 2008/0046557 | A1 | 2/2008 | Cheng |
| 2008/0059894 | A1 | 3/2008 | Cisler et al. |
| 2008/0065663 | A1 | 3/2008 | Farlee et al. |
| 2008/0070496 | A1 | 3/2008 | Jackson |
| 2008/0077808 | A1 | 3/2008 | Teicher et al. |
| 2008/0082578 | A1 | 4/2008 | Hogue et al. |
| 2008/0091655 | A1 | 4/2008 | Gokhale et al. |
| 2008/0126441 | A1 | 5/2008 | Giampaolo et al. |
| 2008/0126442 | A1 | 5/2008 | Cisler et al. |
| 2008/0141029 | A1 | 6/2008 | Culver |
| 2008/0162999 | A1 | 7/2008 | Schlueter et al. |
| 2008/0168184 | A1 | 7/2008 | Freedman et al. |
| 2008/0168245 | A1 | 7/2008 | De Atley et al. |
| 2008/0168391 | A1 | 7/2008 | Robbin et al. |
| 2008/0172428 | A1 | 7/2008 | Stokes |
| 2008/0172607 | A1 | 7/2008 | Baer |
| 2008/0177961 | A1 | 7/2008 | McSharry et al. |
| 2008/0208630 | A1 | 8/2008 | Fors et al. |
| 2008/0214163 | A1 | 9/2008 | Onyon et al. |
| 2008/0216011 | A1 | 9/2008 | Gould |
| 2008/0222512 | A1 | 9/2008 | Albornoz et al. |
| 2008/0229037 | A1 | 9/2008 | Bunte et al. |
| 2008/0250342 | A1 | 10/2008 | Clark et al. |
| 2008/0250400 | A1 | 10/2008 | Vertes |
| 2008/0285754 | A1 | 11/2008 | Kezmann |
| 2008/0307000 | A1 | 12/2008 | Paterson et al. |
| 2008/0307017 | A1 | 12/2008 | Lyons et al. |
| 2008/0307018 | A1 | 12/2008 | Ulrich et al. |
| 2008/0307019 | A1 | 12/2008 | Weiss et al. |
| 2008/0307020 | A1 | 12/2008 | Ko et al. |
| 2008/0307175 | A1 | 12/2008 | Hart et al. |
| 2008/0307333 | A1 | 12/2008 | McInerney et al. |
| 2008/0307347 | A1 | 12/2008 | Cisler et al. |
| 2008/0310628 | A1 | 12/2008 | Fujioka et al. |
| 2008/0310633 | A1 | 12/2008 | Brown et al. |
| 2009/0019291 | A1 | 1/2009 | Murray |
| 2009/0031401 | A1 | 1/2009 | Cudich et al. |
| 2009/0052669 | A1 | 2/2009 | Ma |
| 2009/0116641 | A1 | 5/2009 | Bokor et al. |
| 2009/0254591 | A1 | 10/2009 | Weiss et al. |
| 2009/0307333 | A1 | 12/2009 | Welingkar et al. |
| 2010/0017855 | A1 | 1/2010 | Johnson et al. |
| 2010/0063960 | A1 | 3/2010 | Lehto |
| 2010/0217929 | A1 | 8/2010 | Kirshenbaum et al. |
| 2011/0016089 | A1 | 1/2011 | Freedman et al. |
| 2011/0185762 | A1 | 1/2011 | Freedman et al. |
| 2011/0083088 | A1 | 4/2011 | Cisler et al. |
| 2011/0083098 | A1 | 4/2011 | Cisler et al. |
| 2011/0087976 | A1 | 4/2011 | Cisler et al. |
| 2011/0202763 | A1 | 8/2011 | Martin et al. |
| 2011/0302502 | A1 | 12/2011 | Hart et al. |
| 2012/0124507 | A1 | 5/2012 | Paterson et al. |
| 2012/0185438 | A1 | 7/2012 | Giampaolo et al. |
| 2012/0185518 | A1 | 7/2012 | Giampaolo et al. |
| 2012/0185762 | A1 | 7/2012 | Ozer et al. |

(56) References Cited

U.S. PATENT DOCUMENTS

| | | | |
|---|---|---|---|
| 2012/0198383 A1 | 8/2012 | Cisler et al. | |
| 2013/0066836 A1 | 3/2013 | Weiss et al. | |
| 2013/0073821 A1 | 3/2013 | Flynn et al. | |
| 2013/0212599 A1 | 8/2013 | Giampaolo et al. | |

FOREIGN PATENT DOCUMENTS

| | | |
|---|---|---|
| EP | 1582982 | 10/2005 |
| WO | 01/06356 | 1/2001 |
| WO | 02/101540 | 12/2002 |
| WO | 2005/045756 | 5/2005 |
| WO | 2008/019237 | 2/2008 |
| WO | 2008/019259 | 2/2008 |

OTHER PUBLICATIONS

Tittel, Ed. "An EAZ Way to Restore Crippled and Inoperable Systems." ChannelWeb. Apr. 25, 2005. http://www.crn.com/white-box/161502165.*

Academic Resource Center, http://www.academicresourcecenter.net/curriculum/glossary.aspx.*

Brien M. Posey. "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.*

"Apple Previews Mac OS X Leopard," Aug. 7, 2006 [online] [retrieved on No. 26, 2007] Retrieved from the Internet:<URL:http://www.apple.com/pr/library/2006/aug/07leopard.html>, pp. 1-2.

"Aulaclic: Unit 6. The Recycle Bin," Nov. 2005 [online] [retrieved on Nov. 26, 2007] Retrieved from the Internet<URL:http://www.teacherclick.com/winxp/t_6_1.htm>, pp. 1-2.

Bonwick, Jeff, "ZFS The Last Word in File Systems," [online] [retrieved on Jan. 22, 2008] Retrieved from the Internet:<URL:http://opensolaris.org/os/community/zfs/docs/zfs.pdf>, 34 pages.

Bonwick et al., "The Zettabyte File System," [online] [retrieved on Jan. 22, 2008] Retrieved from the Internet:<URL:http://partneradvantage.sun.com/protected/solaris10/adoptionkit/tech/zfs/zfs_overview.pdf>, 13 pages.

Griffiths, R., "Leopard first looks: Time Machine," Aug. 8, 2006 [online] [retrieved on Nov. 23, 2007] Retrieved from the Internet:<URL:http://www.macworld.com/2006/08/firstlooks/leotimemac/index.php?pf=1> pp. 1-2.

International Search Report and Written Opinion, PCT/US2007/074729, Jul. 12, 2007, 11 pages.

International Search Report and Written Opinion, PCT/US2007/074881, Jul. 12, 2007, 11 pages.

Sun Microsystems, Inc., "ZFS On-Disk Specification," Draft: Dec. 9, 2005, [online] [retrieved on Jan. 22, 2008] Retrieved from the Internet:<URL:http://opensolaris.org/os/community/zfs/docs/ondiskformat0822.pdf,>, 55 pages.

International Search Report and Written Opinion, PCT/US2007/074653, Aug. 14, 2008, 14 pages.

International Search Report and Written Opinion, PCT/US2008/065146, Oct. 31, 2008, 21 pages.

International Search Report and Written Opinion, PCT/US2008/066212, Mar. 9, 2009, 26 pages.

Bott, Ed, "Windows XP Backup Made Easy," Jul. 14, 2003, Microsoft.

Engst, Adam, "Retrospect 6.0: Powerful Backup Program Adds Panther Compatibility and Enterprise Features", Jun. 1, 2004, MacWorld.

Harder, Bobbie, "Microsoft Windows XP System Restore," Apr. 2001, MSDN.

"StorageSync: Backup, Restore, & Synchronization Software User's Guide", SimpleTech, 2003.

International Search Report and Written Opinion, PCT/US2007/074863 Apr. 21, 2009, 20 pages.

Communication pursuant to Article 94(3) EPC for Application No. EP 07 799 899.5, dated May 14, 2009, 2 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

Communication pursuant to Article 94(3) EPC for Application No. EP 07 799 899.5, dated Oct. 7, 2009, 4 pages.

In-link files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/In.html, 5 pages.

Microsoft-TechNet, "Using Encrypting File System," Nov. 3, 2005, Microsoft, 40 pages.

Godfrey, Michael et al., "Using Original Analysis to Detect Merging and Splitting of Source Code Entities," IEEE Transactions on Software Engineering, vol. 31, No. 2. Feb. 2005. pp. 166-181.

Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.

Examination Report from European Application No. 07 813 605.8 dated Oct. 27, 2011, 5 pages.

Examination Report from European Application No. 07 813 540.7 dated Oct. 27, 2011, 5 pages.

Extended European Search Report, European Application No. 11184579.8, Nov. 17, 2011, 6 pages.

Office Action dated Feb. 29, 2012 from related Chinese Application No. 200880024710.0, 11 pages.

Charles Rubin, Mary Millhollon and Katherine Murray, "Microsoft Office Word 2003, Official Manual", First Edition, Japan, Nikkei BP Softpress, Jul. 12, 2004, vol. 1, p. 300, 815-818.

Chen et al., "Data Redundancy and Compression Methods for a Disk-based Network Backup System", 2004, IEEE, pp. 1-8.

Extended International Search Report and Written Opinion, EP 11171738.5, Aug. 29, 2011, 5 pages.

Communication pursuant to Article 94(3) EPC for Application No. EP 07 813 540.7, dated Jun. 23, 2009, 2 pages.

Shi et al., "USP: A Lightweight File System Management Framework," 2010 Fifth IEEE International Conference on Networking, Architecture, and Storage, 2010 IEEE, pp. 250-256.

* cited by examiner

RESTORING ELECTRONIC INFORMATION

RELATED APPLICATIONS

This application is generally related to the following jointly owned and co-pending patent applications, each incorporated herein by reference in its entirety:
U.S. patent application Ser. No. 11/499,839, for "Managing Backup of Content," filed Aug. 4, 2006;
U.S. patent application Ser. No. 11/499,881, for "User Interface for Backup Management," filed Aug. 4, 2006;
U.S. patent application Ser. No. 11/499,879, for "Navigation of Electronic Backups," filed Aug. 4, 2006;
U.S. patent application Ser. No. 11/499,880, for "Architecture for Back Up and/or Recovery of Electronic Data," filed Aug. 4, 2006;
U.S. patent application Ser. No. 11/499,385, for "Searching a Backup Archive," filed Aug. 4, 2006;
U.S. patent application Ser. No. 11/499,885, for "Conflict Resolution in Recovery of Electronic Data," filed Aug. 4, 2006;
U.S. patent application Ser. No. 11/499,840, for "System for Multi-Device Electronic Backup," filed Aug. 4, 2006;
U.S. patent application Ser. No. 11/499,848, for "System for Electronic Backup," filed Aug. 4, 2006;
U.S. patent application Ser. No. 11/499,250, for "Application-Based Backup-Restore of Electronic Information," filed Aug. 4, 2006;
U.S. patent application Ser. No. 11/499,386, for "Links to a Common Item in a Data Structure," filed Aug. 4, 2006;
U.S. patent application Ser. No. 11/499,866, for "Event Notification Management," filed Aug. 4, 2006;
U.S. patent application Ser. No. 11/499,256, for "Consistent Backup of Electronic Information," filed Aug. 4, 2006.

TECHNICAL FIELD

The disclosed implementations relate generally to storing and restoring data.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save its current version on a storage device. The next day, however, the user could have had second thoughts about the revisions, or could have come up with new ideas, and therefore open the file again.

The revision process is usually straightforward if the user wants to add more material to the file or make changes to what is there. But it is typically more difficult for a user who has changed his/her mind about changes that were previously made and wants the file back as it was once before. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens it again, it can not be possible to automatically undo any previous edits.

SUMMARY

Systems and methods are provided for automatic detection of data loss to system or a particular application. In one implementation, the system prompts a user to the occurrence of data loss and suggests invoking a backup system interface to recover the lost data.

In general, in one aspect, a method is provided. The method includes identifying a loss of data associated with a current view. An alert is generated identifying the loss of data. A user is prompted to initiate a history view to restore the lost data, the history view including at least a first visual representation of an earlier version of the current view.

Implementations of the method can include one or more of the following features. The method can further include receiving, while a current view is displayed, a user input requesting that a history view associated with the current view be displayed. The method can further include receiving, while the history view is displayed, a user input requesting that the current view be modified according to the earlier version. The method can further include modifying, in response to the user input, the current view according to the earlier version. Identifying a loss of data can include comparing current data with previous data. The previous data can be associated with a backup. Identifying a loss of data can include monitoring for events indicating data loss or examining an application for lost data when opened. Generating an alert can include presenting an alert notification, the alert notification indicating data can have been lost and where the alert notification provides one or more options for restoring the lost data.

In general, in one aspect, a method is provided. The method includes invoking an application. A current view of the application in a user interface is presented. A loss of data associated with the application is identified. An alert is generated identifying the loss of data. A user is prompted to initiate a history view to restore the lost data, the history view including at least a first visual representation of an earlier version of the current view of the application.

Implementations of the method can include one or more of the following features. The application can be a music application and the lost data can be a playlist. The application can be a messaging application and the lost data can be one or more e-mail messages. The application can be a messaging application and the lost data can be a calendar. The application can be a messaging application and the lost data can be a contacts list. The application can be a messaging application and the lost data can be a buddy list.

In general, in one aspect, a method is provided. The method includes detecting a loss of data associated with a system. An alert is generated identifying the loss of data. The user is prompted to initiate a history view to restore the lost data, the history view including at least a first representation associated with the lost data. The lost data can be user preference data or can be system setting data.

In general, in one aspect, a method is provided. The method includes evaluating a current view of an application. A determination is made that a loss of data has occurred to the current view of the application relative to a past view of the application. The current view of the application is suspended. One or more past views of the application are presented. A past view of the application is reinstated into the current view to restore the lost data.

Implementations can include one or more of the following features. The evaluating can be performed when the application is invoked. The method can further include alerting the user to the data loss and prompting the user to restore the lost data.

In general, in one aspect, a method is provided. The method includes determining that an application has lost data. A prior state of the application is retrieved. A preview of the prior state is presented. The prior state of the application is restored.

The details of the various aspects of the subject matter described in this specification are set forth in the accompanying drawings and the description below. Other features, aspects, and advantages of the invention will become apparent from the description, the drawings, and the claims.

DETAILED DESCRIPTION

Figure 1:
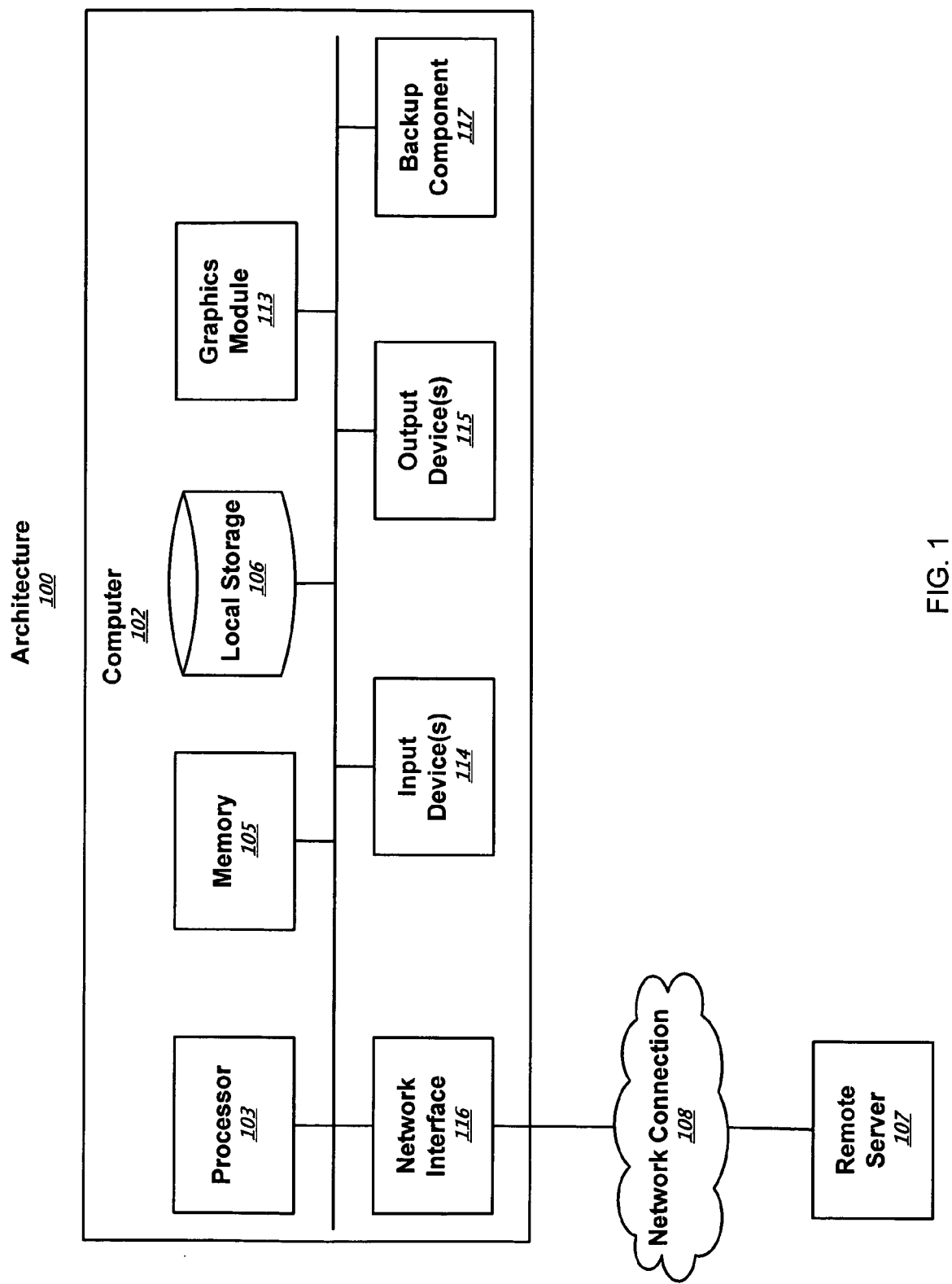
FIG. 1 is a block diagram of an example of an architecture for modifying a user interface view in a display environment.

FIG. 1 is a block diagram of an architecture 100 (e.g., a hardware architecture) for capturing at least one earlier version of a user interface view and allowing a user to initiate a restoration based on it. As used herein, a view refers to an item, element or other content, capable of being presented in a user interface, that can be subjected to a backup operation by a backup component 117. For example, a user interface view can contain any number of icons, files, folders, application state information and/or machine state information, etc. The architecture 100 includes a personal computer 102 communicatively coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115. Architecture 100 as disclosed includes various hardware elements. Architecture 100 can include hardware, software, and combinations of the two.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for modifying an interface view (e.g., a user interface view). The systems and methods can be stand alone, or otherwise integrated into a more comprehensive application. In the materials presented below, an integrated system and method for modifying a user interface view is disclosed.

Though discussion is made with reference to modifying a user interface view, those of ordinary skill will recognize that such a view can be based on various data structures, files, processes, and other aspects of information management. It follows that modification to file structures, data and the like is also contemplated in order to achieve the modification to the user interface view. In other words, while the restoration of the user interface view from one state to another can be the most apparent change from the user's perspective, this is accomplished through the corresponding changes in the underlying system content.

One of ordinary skill in the art will recognize that the engines, methods, processes and the like that are described can themselves be an individual process or application, part of an operating system, a plug-in, an application or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 that allows for the storage of versions of the computer's files or other items, for example within the local storage 106 or in an external storage repository. In one implementation, the backup component 117 also allows a user to select any of the stored versions and use it to initiate a restoration of that version in the computer.

Figure 2:
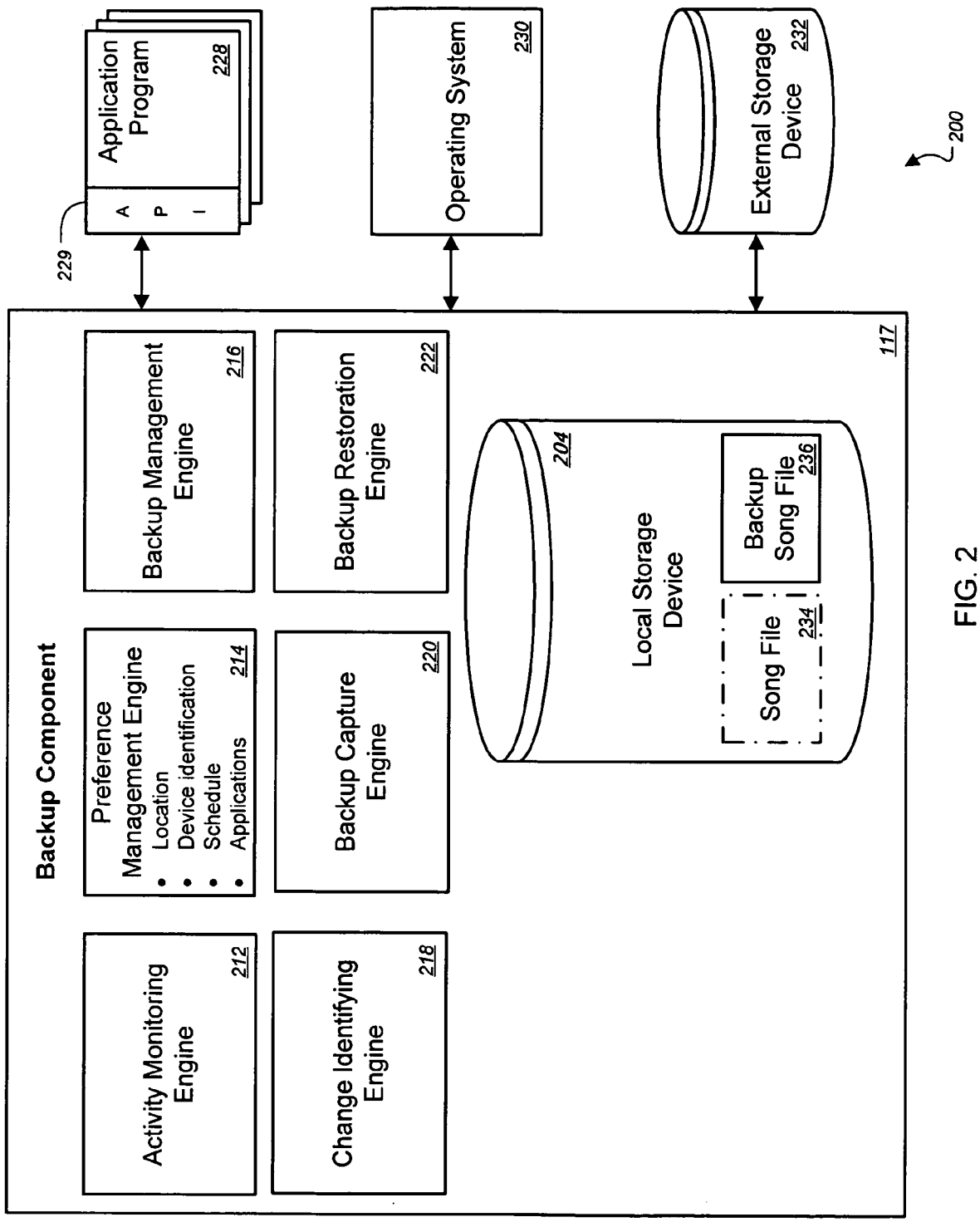
FIG. 2 is a block diagram of an example of an architecture for backing up and restoring.

FIG. 2 is a block diagram of an exemplary architecture (e.g., software architecture) 200 for enabling the back up and restoration of elements of items such as, application files, for example, those associated with a set of application programs 228.

Each application program 228 can include an application programming interface (API) 229. The architecture 200 can utilize API 229 techniques to access application programs and enhance them with further functionality. For example, the API 229 can link several applications together for providing a single service on all linked applications. Particularly, the time machine architecture can utilize API techniques to enhance application programs with the time machine functionality. The API tools can link several applications to the time machine engine by using an API for providing a similar menu or icon for each application. For example, the API can be used by the time machine when generating a backup version of a current state of the application. As another example, the API can be used when the application is restored, through the time machine, to a state that corresponds to a backup version. Although API 229 is shown in FIG. 2 as part of application programs 228, the API can be separate from the application programs 228. For example, the API 229 can be separately located and made available by the system for use by one or more of the application programs 228.

In one implementation, the backup component 117 provides backup and restoration capability for the system. Many different items or elements can be the subject of a back up in the system. For example, folders, files, items, information portions, directories, images, system parameters, playlists, address books, e-mails, e-mail folders, application states, preferences, and the like all can be candidates for archiving. Other types are also possible. In this example, the backup component 117 includes a local storage device 204 and an external storage device 232. Versions can be stored on either of them. Any number of local and/or external storage devices can be used by the backup component 117 for storing versions. In one implementation, no local storage is provided.

In one implementation, one copy of original data (e.g., folders, files, items, information portions, directories, images, system parameters, playlists, address books, e-mails, e-mail folders, application states and the like) is stored in the system in addition to the original (i.e., a backup copy). When one or more subsequent copies are made, each one can contain only the differences between the current data version and the original backup copy, thereby saving storage space. In some implementations, the storage devices 204 and 232 can be used to store the backup copy of the data as well as links pointing to the data in the backup copy, or other backup data from a subsequent backup operation. The links can be hard links which reference, or point to, physical data, or as another example can be symbolic links that reference another file on the storage device.

For example, a song file 234 can be stored on the local storage device 204. At some point in time, a backup song file 236 has been created from the song file 234. In everyday use, when a person listens to the song corresponding to these song files, it is from the song file 234 (i.e., the original version) that the music is retrieved. Should the song file 234 disappear or become corrupt, the backup song file 236 can be used.

The backup song file 236 can contain data that differs from the original song file 234, such as data containing incremental changes that have occurred to the original song file over time. In addition, backup song files can contain a link pointing to a first backup of the song file 236. For example, the song file 234 can include the first backup of data, while the backup song file 236 can include changes made since the first backup of data, and a link pointing to the first backup of data. In some situations, the backup data does not differ, and it can therefore be sufficient to store only the link to the first backup song file in the backup song file 236.

The backup component 117 can interact with one or more of the applications using the corresponding API. In one implementation, this can provide backing up of that application's files, state or other items, and can provide for user restoration of a selected backed up version, to name two examples. In one implementation, the backup component 117 runs as a background task on an operating system 230 that is not visible to the user. The backup component 117 can be capable of operating on data belonging to any and all user accounts on the system.

The backup component 117 includes an activity monitoring engine 212. In one implementation, the activity monitoring engine 212 monitors for changes within applications (e.g., application files or state) that are targeted for a backup operation. A change can also include the addition of new files or other data structures, or deletion of existing ones. For example, the activity management engine 212 can be responsible for verifying the integrity of a playlist in a music file management program, or for verifying that a corresponding song file exists for a listed song.

In one implementation, the activity monitoring engine 212 is capable of discerning between a substantive change (e.g. the text within a document has been modified) and a non-substantive change (e.g. the play count within an iTunes playlist has been updated, or several changes cancel each other out) through its interaction with the application programs 228. The activity monitoring engine 212 can, for example, create a list of modified elements to be used when a backup event is eventually triggered. In one implementation, the activity monitoring engine 212 can monitor the system for periods of inactivity. The activity monitoring engine 212 can then trigger a backup event during a period of time in which the backup activity won't cause a system slowdown for an active user.

A preference management engine 214 specifies some operating parameters of the backup component 117. In one implementation, preference management engine 214 contains user-specified and/or system default application parameters for the backup component 117. These can include settings for the details of capturing and storing the views. For example, the preference management engine 214 can determine the frequency of the backup capture, the storage location for the backup versions, the types of elements (e.g., files or other items) that are eligible for backup capture, and the events which trigger a backup capture (periodic or event-driven, etc.). In one implementation, the preference management engine 214 can detect that a new storage device is being added to the system and prompt the user whether it should be included as a backup repository. Files and other items can be scheduled for a backup operation due to location (e.g. everything on the C: drive and within D:/photos), a correlation with specific applications (e.g. all pictures, music, e-mail in an inbox, an address book, and system settings), or a combination of strategies. Different types of items can be scheduled to be stored on different devices or on different segments of a storage device during a backup operation. In one implementation, the backup component 117 stores the versions in a format corresponding to a file system structure.

A backup management engine 216 coordinates the collection, storage, and retrieval of views performed by the backup component 117. For example, the backup management engine 216 can trigger the activity monitoring engine 212 to watch for activities that satisfy a requirement specified in the preference management engine 214.

A change identifying engine 218 locates specific files or other items within to determine if they have changed. The change identifying engine 218 can be capable of discerning a substantive change from a non-substantive change. For example, the change identifying engine 218 can identify a loss of data associated with a user's current view. In one implementation, the change identifying engine 218 traverses a target set of files or other items, comparing a previous version to the current version to determine whether or not a modification has occurred. In addition, the change identifying engine 218 can generate an alert identifying the loss of data, and prompt the user to initiate a previous version of the current view to restore the lost data. For example, the change identifying engine 218 can be responsible for verifying whether a data loss has occurred in a music file management program, or for verifying that a corresponding song file is unchanged for a listed song.

A backup capture engine 220 locates views (e.g., elements, files or other items) that are to be backed up. The backup capture engine 220 can invoke the activity monitoring engine 212 and/or the change identifying engine 218, for example, to generate a capture list. The backup capture engine 220 can then store copies of these elements in one or more targeted storage repositories. The backup capture engine 220 can track multiple version copies of each item included in the backup repository.

The backup component 117 includes a backup restoration engine 222 to restore previous versions of views (e.g., files or other items). In one implementation, the backup restoration engine 222 provides a user interface (e.g., a graphical user interface) where a user can select the item(s) to be restored.

Figure 3:
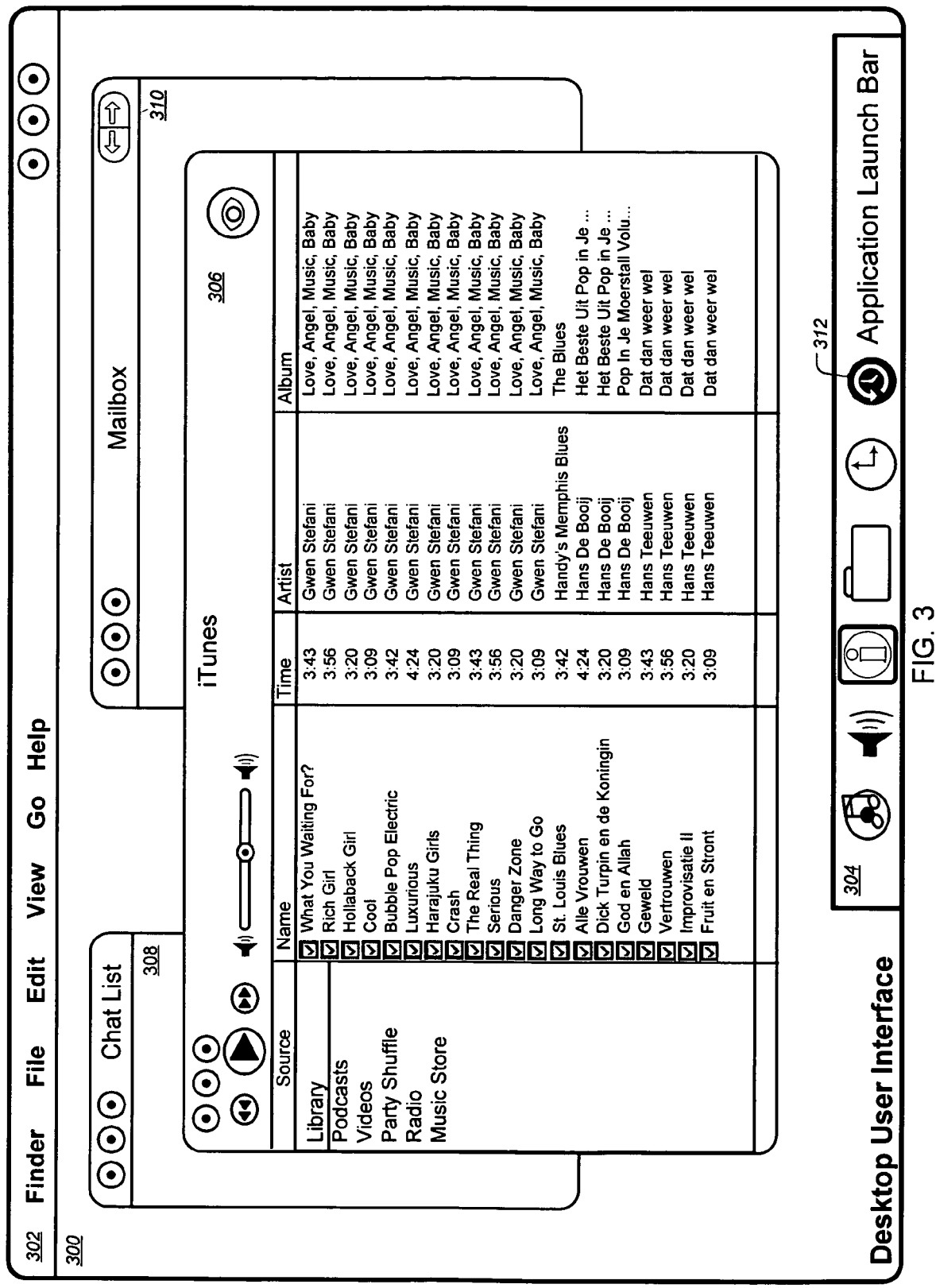
FIG. 3 is a screen shot depicting an example of a desktop user interface with multiple open applications.

FIG. 3 is a screen shot depicting an example of a user interface 300 (e.g., a desktop user interface) with multiple open applications. The user interface 300 (also referred to herein as "desktop") can be a conventional user interface as can be provided by an operating system. The user interface 300 has a background, a menu bar 302, an application launch bar 304, and can include windows, icons, and other elements. Other configurations are possible. The user interface 300 can have multiple applications running, any or all of which can be presented in a separate window. While working with the applications, or at some other time, a user can initiate a time machine session in the system.

As shown in FIG. 3, a user has launched an iTunes™ application window 306 (available from Apple Computer in Cupertino, Calif.) which is currently presented in the foreground, and a chat application 308 and a mail application 310 that are presented in the background. In particular, the iTunes™ application window 306 is here displaying contents of the user's library, which lists the user's songs. The iTunes™ application can be used for accessing, playing and organizing media, such as digital music, pictures and video files.

The time machine engine can be activated to back up or restore content within the iTunes™ application or another application. Additionally, the time machine engine can be activated to back up or restore other data such as system data and preferences. In one implementation, the user can activate a time machine session from the user interface using a user-selectable time machine icon 312 in the application launch bar 304. As another example, the time machine session can be activated from the menu bar 302. The menu bar 302 can include a time machine options menu in addition to the activation selection. The time machine options menu can include selections allowing a user to specify data to include in a particular backup operation. For example, in iTunes™, the user can identify which content to include in the backup (e.g., playlists, but not play counts, purchased songs, but not others, etc.). In addition, the user can recover songs that were previously included, but are now missing from the iTunes™ library. For example, if at least one backup of the missing songs has been made at an earlier date, the user can enter the time machine to search for the missing songs or files in a backup snapshot of the iTunes™ application. This provides for restoration of a view corresponding to that prior time. As used herein, a snapshot refers to a backup element stored in a historical archive that includes a backup of selected items or content as specified by the backup component 117.

The time machine engine can proactively detect lost data when an application is launched. For example, when the iTunes™ application is launched, a system (e.g., the application, a part of the operating system, a backup system, etc.) can examine the application files for lost data, such as data corruption or missing data files. Data loss can occur, for example as a result of an application/system failure, virus, or inadvertent deletion. When data is missing, the time machine engine can generate an alert identifying the lost data, and provide a way for the user to restore the data using the time machine interface. Thus, the API 229 that connects particular applications to the time machine engine can be used in generating the alert. In some implementations, the time machine compares previous data from an earlier backup with the current to identify lost data (e.g., the content of an iTunes library in an earlier backup can be compared with the current library). In other implementations, the system (e.g., the backup daemon) monitors changes and can generate the alert when particular changes are detected. For example, the system can monitor constantly in the background e.g., by monitoring system events. For example, after a failure event, the backup system can determine whether or not data has been lost. If so, the backup system can prompt the user to restore the lost data using the time machine snapshots to select a prior intact version of the lost data.

In one implementation, the can detect lost data associated with other applications. For example, when launching a messaging program, lost data can be detected such as lost e-mail messages, lost contact information from a contacts list (e.g., names and addresses of contacts), or lost calendar data. In another implementation, the lost data can be from a "buddy list" of a messaging program (e.g., instant messaging).

Alternatively, the system can detect lost data associated with a computer system such as lost system settings or preferences. For example, preferences can include preferences associated with input devices (e.g., keyboard and mouse settings), system settings (e.g., display device preferences, printer preferences), and user interface settings (e.g., preferences defining a look and feel of the user interface such as colors, background images and, screensaver preferences). Thus, system data can also be recovered after a system failure event.

The time machine backup engine includes functionality to identify the kinds of data that will be protected. The time machine backup engine can also have defined therein events that trigger recovery. Such events can distinguish between permanent and non-permanent data loss. For example, a recovery event can be the creation of a backup that differs from a prior backup in a predefined way, and the detection of this condition results in a trigger. Other recovery events are possible. In one implementation, a set of rules is used to determine whether not identified data loss triggers recovery.

Figure 4:
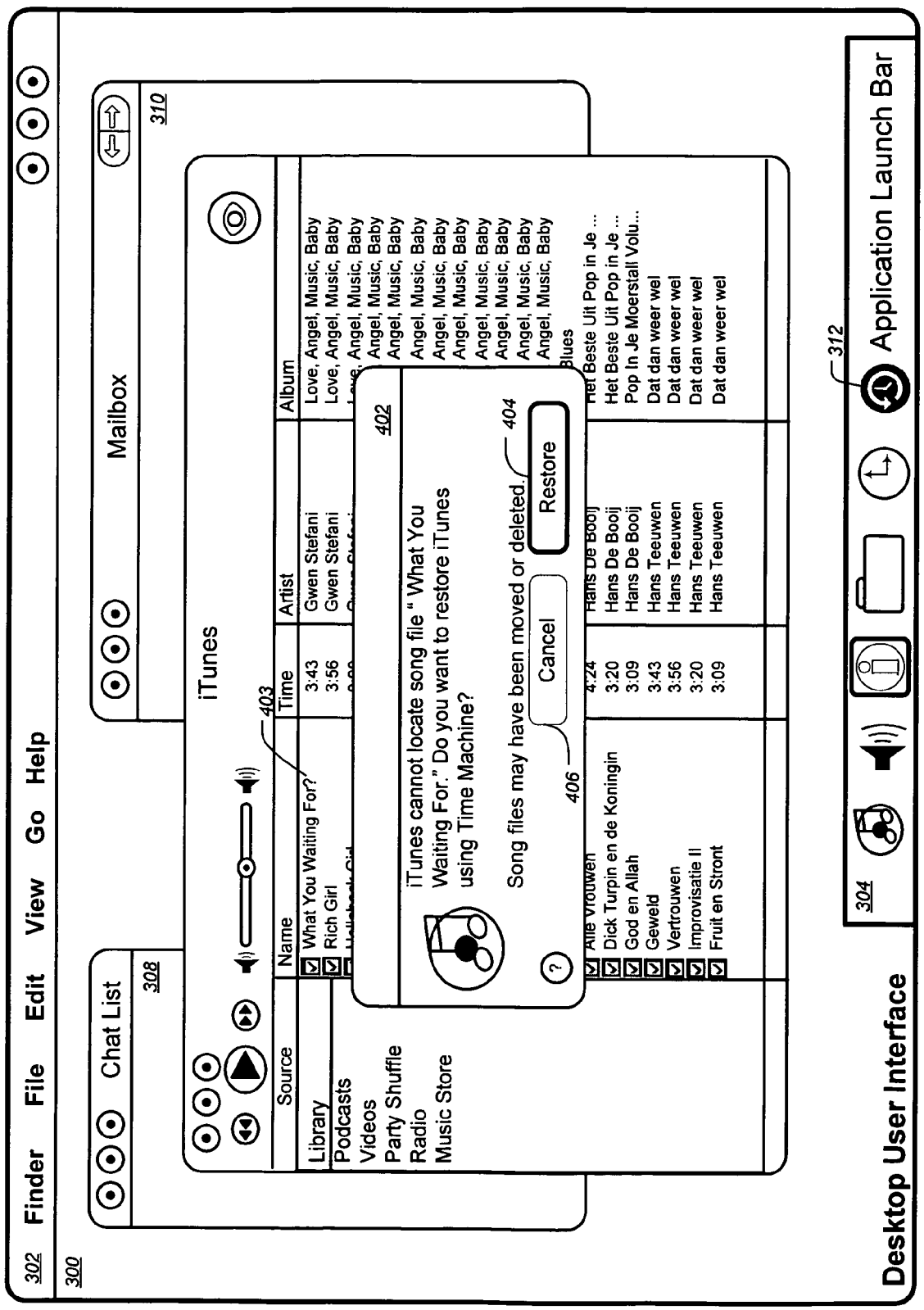
FIG. 4 is a screen shot depicting an example of an alert message that can appear when lost data is detected.

A determination of data loss can be made upon the initiation of an application, upon a specific user input, or at a predefined time, to name a few examples. Here, assume that data loss is detected for the iTunes™ application window 306. FIG. 4 shows an example of an alert message 402 generated by the system when lost data is detected. As shown, the alert 402 notifies the user that iTunes™ cannot locate a particular song file 403 listed in the library, and that this could be because data has been moved or deleted. In some implementations, the alert can indicate that the data is present in the system, but corrupted in some way. The user has the option of selecting a restore button 404 to enter the time machine interface to restore the lost files (i.e., using a snapshot of a recent backup). Alternatively, the user can select a cancel button 406 to cancel the alert and return to the application. Other user options can be used.

Figure 5:
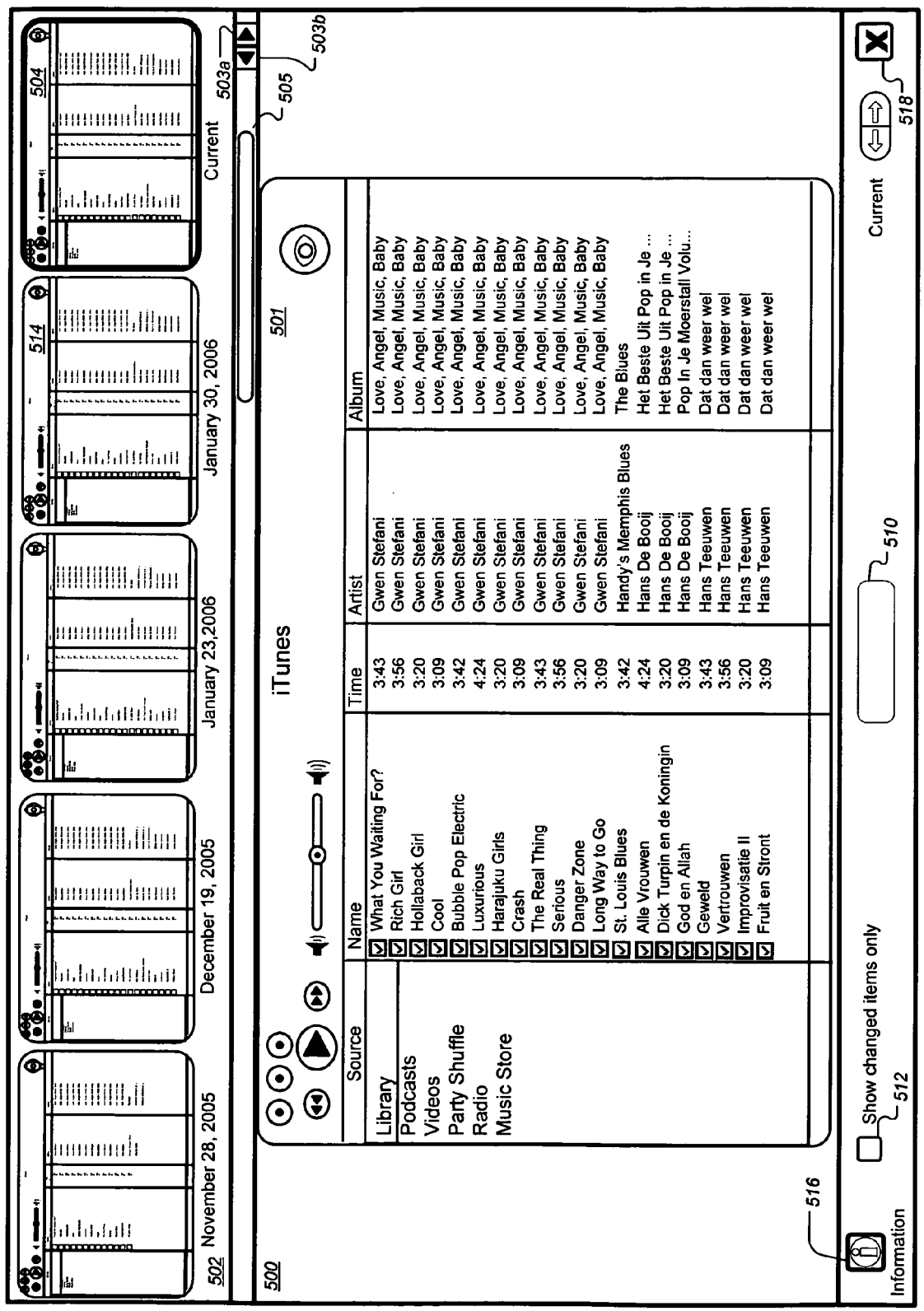
FIG. 5 is a screen shot showing a time machine interface invoked after presentation of the alert message of FIG. 4.

FIG. 5 is a screen shot showing a time machine interface 500. Here, the time machine interface was invoked from the alert message 402 of FIG. 4. Upon the time machine interface being launched, the user can search for the missing data that prompted the alert message 402, and optionally restore this data. In some implementations, the user can also restore data content other than the missing data using the time machine interface.

The time machine interface 500 here includes a presentation window 501, a timeline 502, and function buttons. The timeline 502 includes a number of snapshots. The time machine user interface 500 can also include function buttons. For example, the interface 500 can include arrow buttons 503a and 503b, and an associated scroll bar 505 to allow the user to navigate to additional snapshots not shown in the current timeline window. Thus, there can be a large number of snapshots from which to select. As shown, the presentation window 501 is displaying the current state of the iTunes™ application because a "current" snapshot 504 has been selected (highlighted) in the timeline. The current snapshot can be a default selection. The presentation window 501 can show the contents corresponding to the currently selected snapshot, or a portion thereof.

In this particular example, the timeline contains a date beneath each snapshot indicating when the snapshot was taken. In some implementations, the user can select items or content within the snapshots. The selection functionality can be used in earlier snapshots, such as snapshot 514, to restore missing data to the state associated with the current snapshot 504.

The timeline 502 can include a number of snapshots representing earlier versions or states of the iTunes™ library that have been backed up. Each snapshot provides a screenshot representation of the earlier version of the iTunes™ library at a particular point in time. In some implementations, the timeline 502 includes a visual representation of backup elements, such as a miniature version of the earlier state. The timeline can appear across the top portion of the time machine interface 502 (as shown). Alternatively, the timeline does not appear in the top portion of the time machine interface 500 until a user moves their cursor to (or otherwise activates) the timeline (e.g., by activating the top portion of the interface).

The interface can include a restore button 510 that, when selected, restores the view to the selected state represented by the selected snapshot, or to a selected portion thereof, to name two examples. In some implementations, this terminates the session of the time machine. A user can select one element in a snapshot and then select the restore button 510 to modify the current version of the element selected (e.g., restore the state of the view). For example, in iTunes™, the user can select one or more songs to restore, and this can trigger the restore button to display a more precise message, such as "restore selection only."

In one implementation, a changed items only checkbox control 512 filters the snapshots to show only those that differ from the current state. In one implementation, the checkbox control 512 does not refer to the incremental changes between snapshots in the timeline 502, but rather when invoked acts to omit those snapshots whose states are identical to the current state of the iTunes™ library from presentation in the timeline. For example, if the most recent snapshot 504 is identical to a snapshot 514 that occurs earlier in time, selecting the changed items only checkbox control 512, in one implementation, causes the time machine to cease displaying one of these versions, e.g., by removing the snapshot 514 from the timeline. This can help the user to view only snapshots that contain changes to the current version An information button 516 provides information regarding the selected snapshot. In one implementation, selecting the information button 516 opens a panel display. The panel display can provide information including the date and time the snapshot was made, the location of actual contents in a snapshot, the size of the snapshot, and a comment section, to name a few examples. A close button 518 can be selected to exit the time machine and return the user to the user interface 300. In some implementations, the time machine engine can automatically close upon a particular snapshot being restored. In some implementations, the user can minimize the time machine for purposes of navigating to other applications, such as an email application or a web browser.

As shown in FIG. 5, the current snapshot 504 is selected and displayed in the time machine interface 500. The library entry for the missing song file indicated in FIG. 4 (What You Waiting For) is presented at the top of the user's library. However, as indicated in the above description of FIG. 4, the alert message 402 indicates that the actual data for the song file could not be located. In some implementations, the song file could have been deleted, moved or otherwise modified, causing the backup system to generate the alert. For example, when several versions of song file libraries are maintained on one system (e.g., multiple users creating their own libraries), the song files can have been overwritten with different song files for one particular user. In some implementations, a particular user's song files can be corrupted by a system or application error. For example, the song names can appear in the user's library, but the underlying song file can be missing. Therefore, the user may wish to select another snapshot than the current snapshot 504 and attempt to restore the missing or corrupted file.

Figure 6:
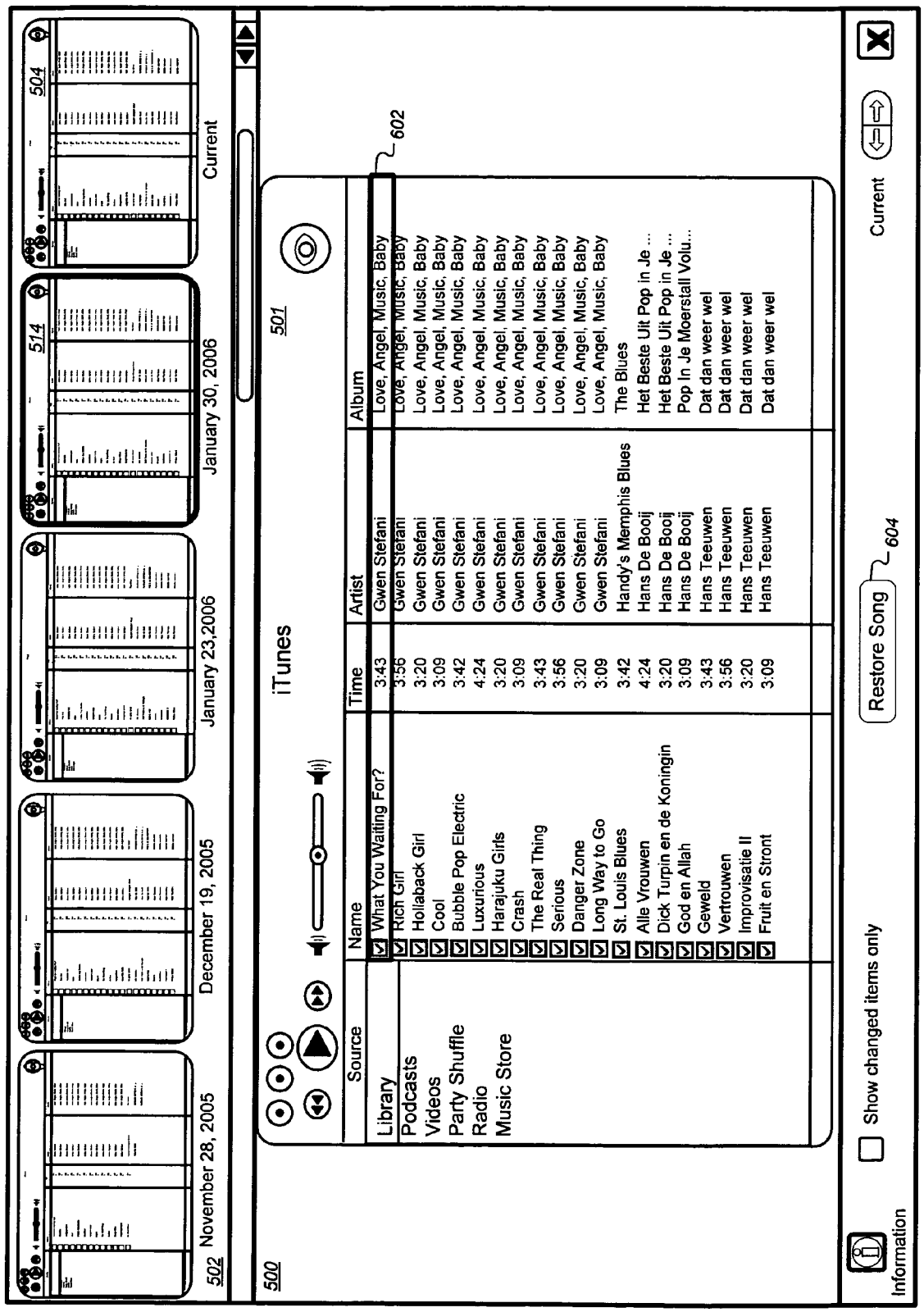
FIG. 6 is a screen shot depicting the time machine interface of FIG. 5 wherein a portion of a snapshot has been selected for restoration.

FIG. 6 is a screen shot depicting the time machine interface of FIG. 5 wherein the snapshot 514 has been selected. The iTunes™ application interface corresponding to the selected snapshot 514 (labeled Jan. 30, 2006) is displayed in the presentation window 501. The user has selected the snapshot 514 to display a history view containing a library entry 602 for the missing song file. The time machine interface can automatically highlight the library entry 602 for the missing song file based on the earlier display of the alert message 402 (FIG. 4). As another example, the user can select the library entry 602 using a pointing device. The user can select a restore song button 604 to restore the song to the current snapshot 504. This can trigger the system to restore the missing song file so that it can be played from the iTunes™ interface. Upon selecting the restore song button 604, the time machine engine can exit and return the user to the user interface 300. In some implementations, the user can choose to remain in the time machine to perform further restorations.

Figure 7:
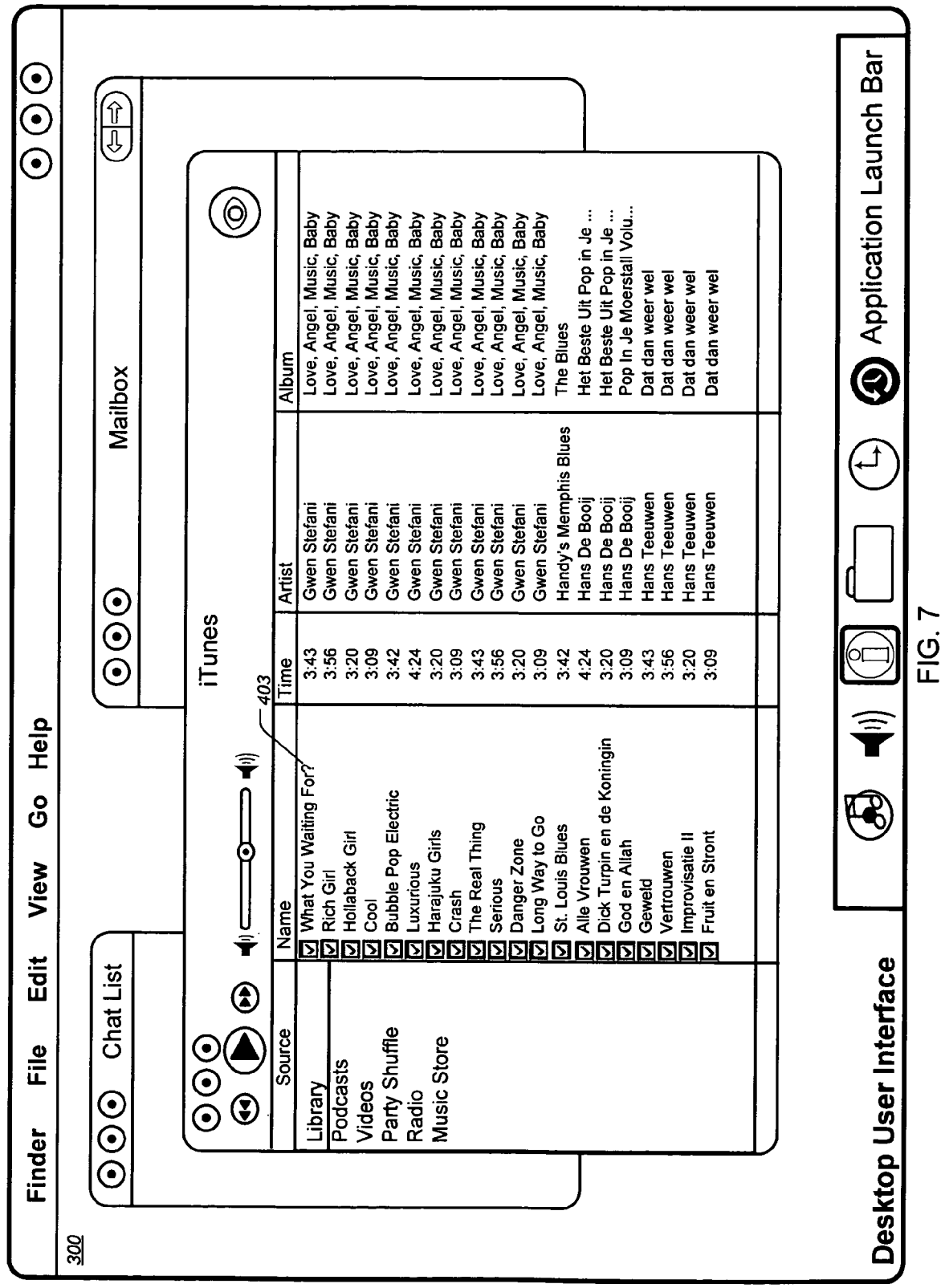
FIG. 7 is a screen shot showing the desktop user interface after some contents from an earlier version have been restored using the time machine engine.

FIG. 7 is a screen shot showing the user interface 300 after some contents from an earlier version have been restored using the time machine engine. The library entry 403 and the rest of the iTunes™ interface here have the same appearance as in FIG. 4. However, the song file corresponding to the library entry 403 has been restored, and accordingly can now be accessed in the iTunes™ application. This is indicated by the absence of the alert message 402.

Figure 8:
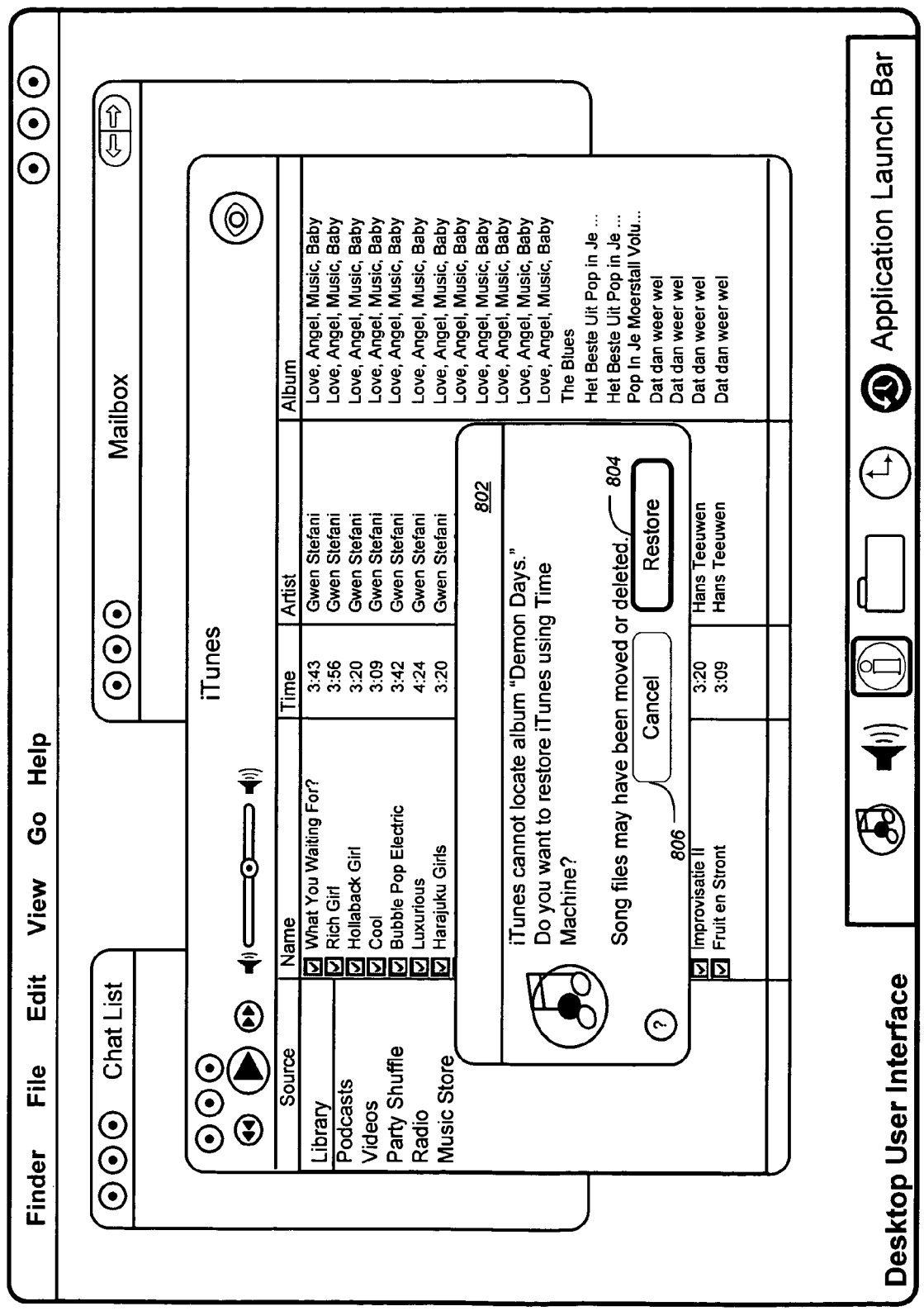
FIG. 8 is a screen shot depicting another example of an alert message that can appear when lost data is detected.

FIG. 8 is a screen shot depicting another example of an alert message 802 that can appear when data loss is detected. The alert message 802 can appear when the application is launched, or because the system has detected a deletion for particular data content. In some implementations, detection parameters can be set by a user for periodic activity (e.g., daily scanning for data loss detection). As shown, the alert message 802 notifies the user that data could have been moved or deleted. In this example, the alert message 802 indicates that iTunes™ cannot locate an album named "Demon Days." The songs of the album are not shown in the current library. This indicates that the user could have deleted the album intentionally, or the library file could have been deliberately or inadvertently modified since the last launching of the iTunes™ application. The user may wish to restore the missing album and can begin doing so by selecting the restore button 804 to enter the time machine interface. Alternatively, the user can select the cancel button 806 to cancel the alert and return to the application. Other user options can be used.

Figure 9:
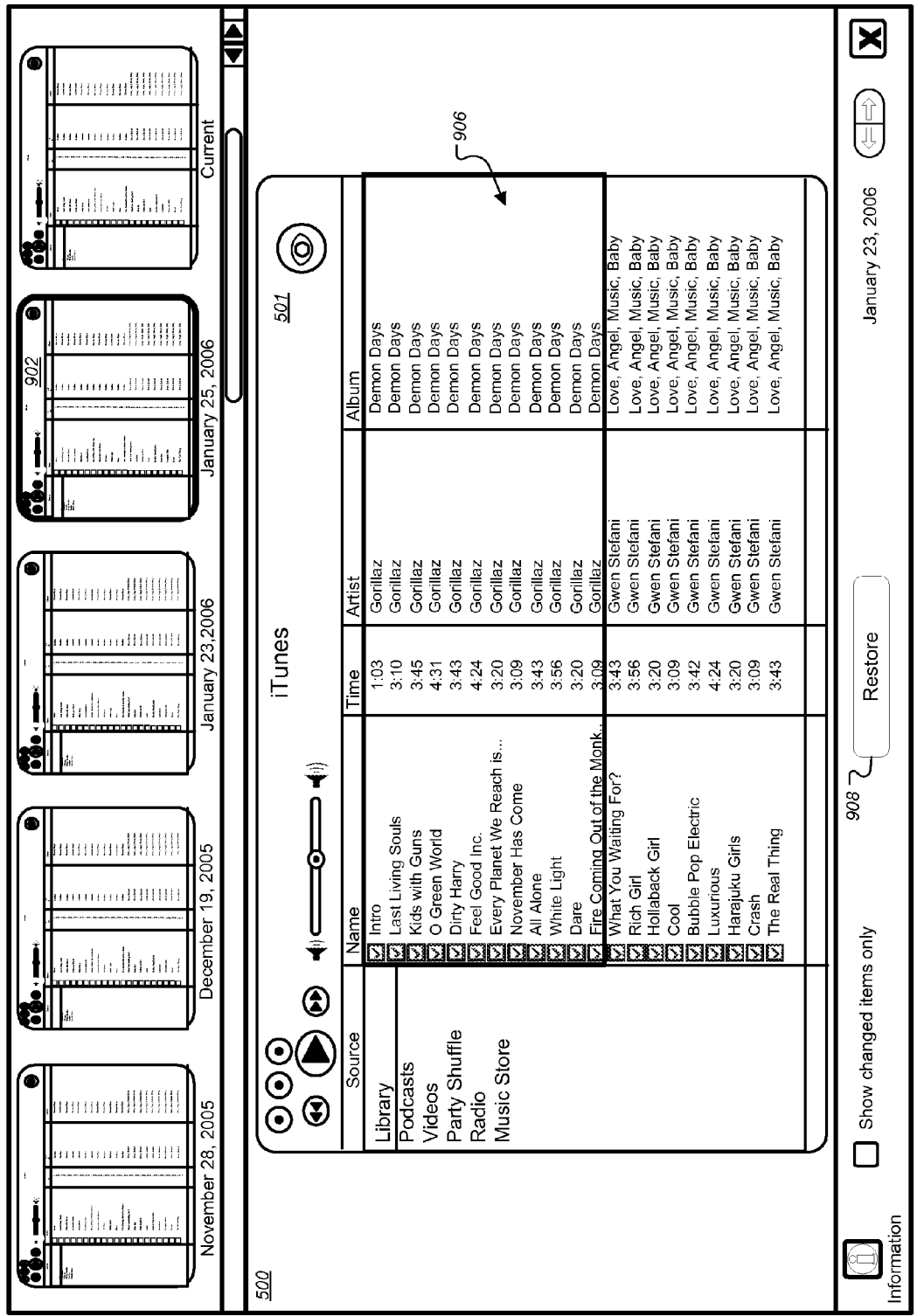
FIG. 9 is a screen shot showing a time machine interface invoked after presentation of the alert message of FIG. 8.

FIG. 9 is a screen shot showing the time machine interface 500. Here, the time machine interface was invoked after presentation of the alert message 802 of FIG. 8. Upon the time machine interface being launched, the user can select at least one suitable backup snapshot, such as snapshot 902 (labeled Jan. 25, 2006), and optionally restore this data. In this example, the snapshot 902 was selected for viewing and displayed in the time machine interface 500. The snapshot 902 includes songs 906 from a previously missing album (identified in FIG. 8) named "Demon Days." The time machine interface can automatically highlight the songs 906 based on the earlier display of the alert message 802 (FIG. 8). Upon determining which songs or album to restore, the user can restore the data content by selecting a restore button 908. This can trigger the system to restore the missing album so that it can be played from the iTunes™ interface. In some implementations, other albums and song files can be restored along with the missing album 906.

Figure 10:
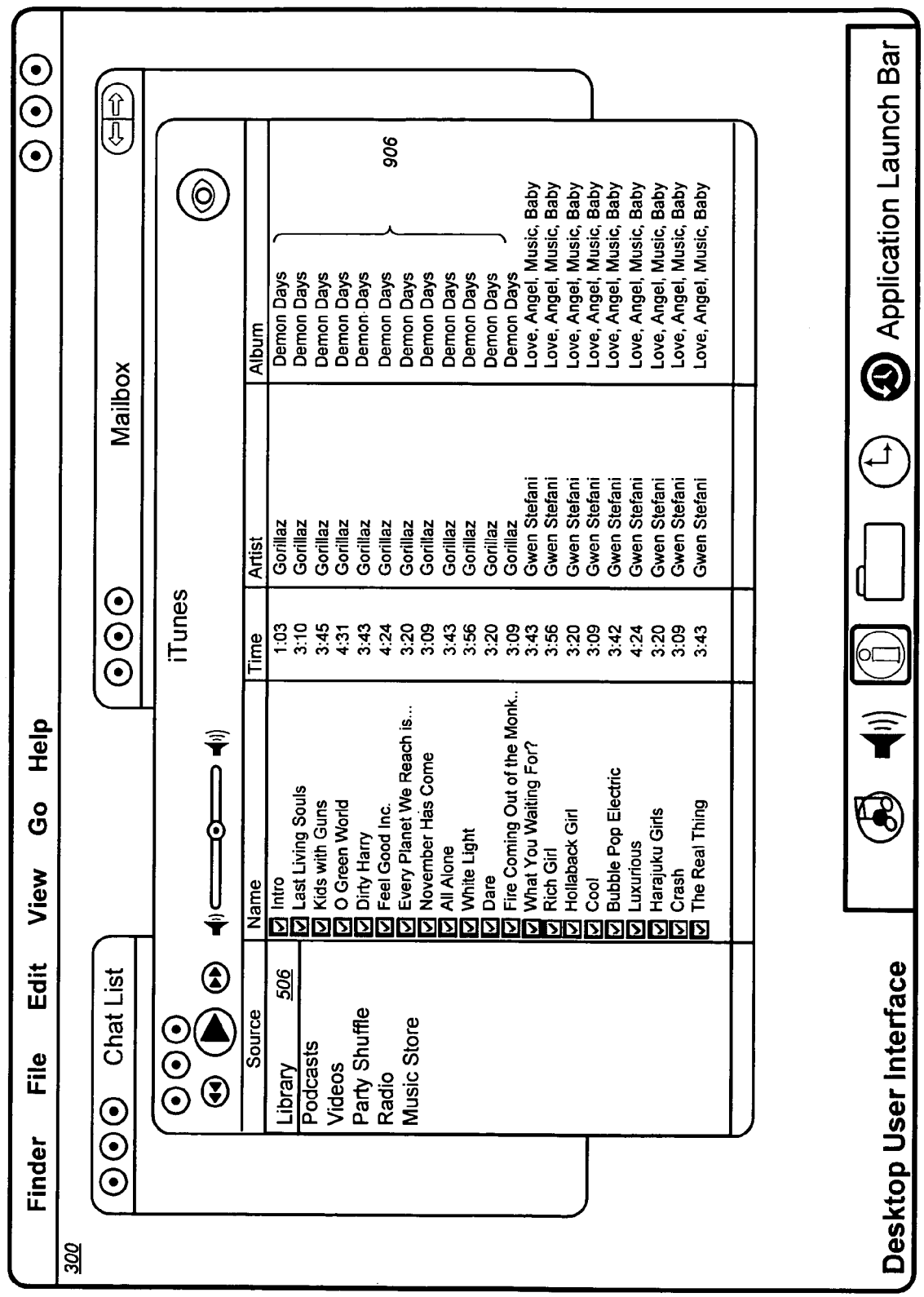
FIG. 10 is a screen shot showing the desktop user interface after some contents from an earlier version have been restored using the time machine engine.

FIG. 10 is a screen shot showing the desktop user interface 300 after some contents from an earlier version have been restored using the time machine engine. As shown, the iTunes™ library now includes the restored songs 906 from the "Demon Days" album. In this example, song content represented by one snapshot was collected and restored, and accordingly can now be accessed in the iTunes™ application.

Figure 11:
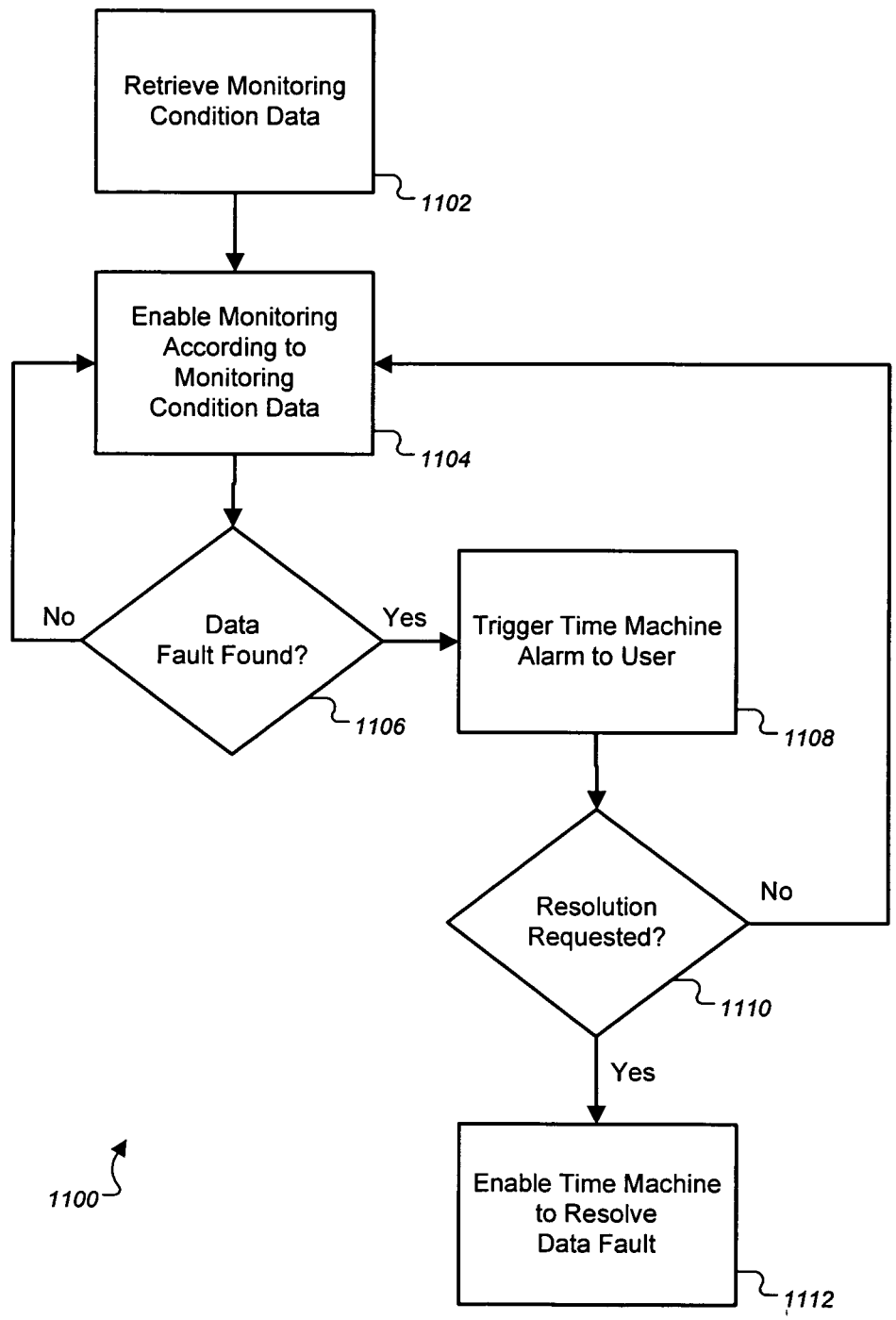
FIG. 11 is a flow chart of exemplary operations that can identify a loss of data associated with a backup operation.

FIG. 11 is a flow chart of exemplary operations 1100 that can identify a loss of data associated with a backup operation. The operations 1100 can be performed by a processor executing instructions stored in a computer program product. The operations 1100 begin in step 1102 with retrieving monitoring condition data related to a particular backup operation. For example, the time machine engine can retrieve the data from the preference management engine 214 (FIG. 2). The monitoring conditions trigger the time machine engine to begin a backup operation. For example, a user can pre-configure monitoring conditions using the time machine interface before backup operations occur. Monitoring conditions can include specific events, such as a file change or deletion, or another condition that can trigger the system to determine that a backup operation should be performed. Once the monitoring conditions have been determined and retrieved, a monitoring engine can be enabled to monitor a selected application or element, in step 1104. For example, this can be done by the activity management engine 212 or the change identifying engine 218. The monitoring process can be performed on a specific schedule, or in the background as an ongoing process. Next, in step 1106, the time machine engine can monitor whether or not a data fault has been identified. For example, when an iTunes™ song file has been deleted (as shown in FIG. 8), the time machine engine can trigger an alarm notifying the user about the missing song file. When a data fault has not been identified, the time machine engine can continue to monitor for data loss, in step 1104. When a data fault has been identified, the time machine engine can generate an alert, in step 1108, which can prompt a user to make a decision regarding backup operations. In this example, the alert can inquire whether or not the user wishes to restore the missing song file. If the user chooses, in step 1110, not to restore the missing song file, the time machine engine can continue to monitor for data loss, as shown in step 1104. For example, the user selects the cancel button 806 (FIG. 8). If the user wishes to restore the song file, the time machine engine can be enabled to resolve the data fault, in step 1112. For example, the user selects the restore button 804 (FIG. 8). Some or all of the operations 1100 can be performed repeatedly as a continuous process. For example, after completion of step 1112, the operations can return to the step 1104.

Figure 12:
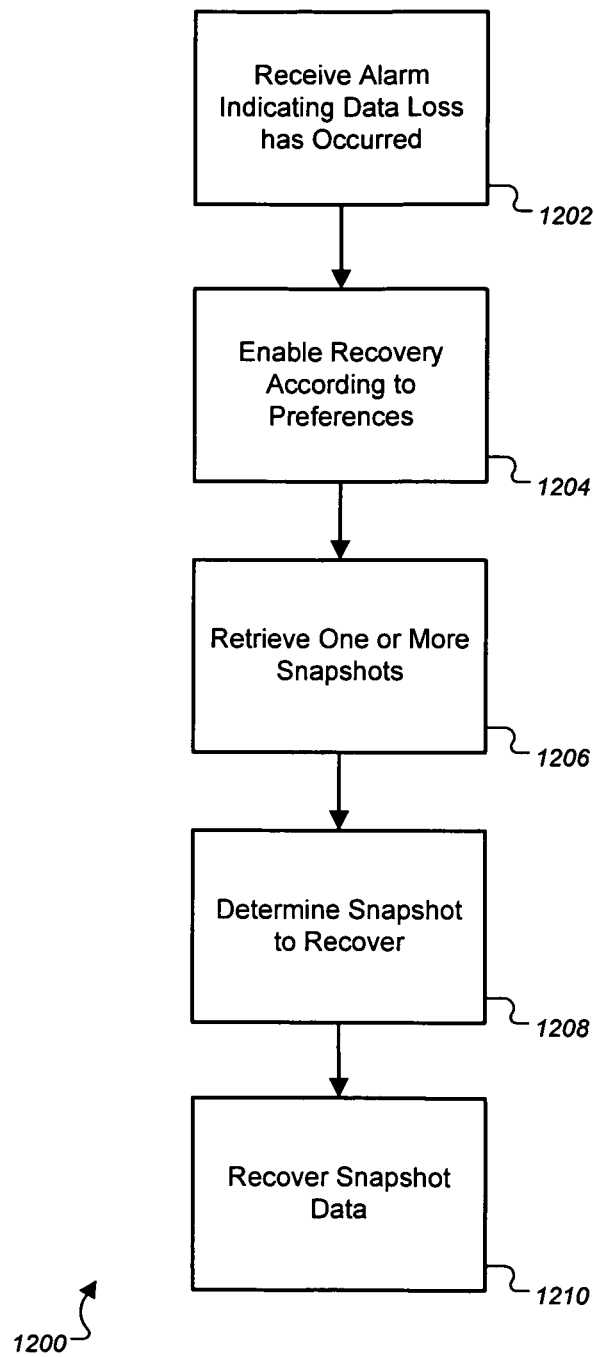
FIG. 12 is a flow chart of exemplary operations that can be performed to recover lost data.

FIG. 12 is a flow chart of exemplary operations 1200 that can be performed to recover lost data. The operations 1200 begin in step 1202 when there is received an alarm indicating that data loss has occurred. The term "data loss" can include a determination that data that was once present is now missing, that data has been corrupted, or that data cannot be located in the system. For example, a user can permanently delete data (intentionally or unintentionally) or an application error or system error can result in lost data. The determination can be done, for example, by the activity management engine 212 or the change identifying engine 218. Upon determining that a data loss has occurred, recovery of the data according to predetermined preferences can be enabled, in step 1204. For example this can be done by the backup restoration engine 222. Next, one or more earlier snapshots can be recovered, in step 1206, for the user to review. For example, several earlier versions of the lost data can exist in backup snapshots, and the user may wish to only recover the most recent backup version. One or more snapshots selected by the user for restoration can be determined, in step 1208, and the snapshot data can be recovered, in step 1210. For example, this can be done using the time machine interface (FIG. 9). In some implementations, the user can recover multiple snapshots.

The above examples involve backup versions of music libraries. Many different types of applications, content, items, elements or processes can be backed up and made accessible through a time machine engine.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and, similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method performed by one or more processors, the method comprising the following operations:
    displaying a current view of a first application user interface window of a first application, where the current view of the first application user interface window shows a current state of the first application user interface window and includes visual representations of data corresponding to the current state of the first application;
    identifying a loss of data associated with the first application;
    in response to identifying the loss of data, generating an alert identifying the loss of data and prompting a user to initiate a history view of the first application to restore the identified lost data;
    receiving user input to initiate the history view;
    displaying a second backup user interface of a second backup application, the second backup user interface including at least a first representation of the first application user interface window, where the first representation shows a past state of the first application user interface window and includes visual representations of data from the past state, including a visual representation of the lost data, and wherein the lost data is stored in an archive; and
    receiving input to the first representation of the first application user interface window displayed within the second backup user interface identifying one or more application data items to restore.

2. The method of claim 1, further comprising:
    receiving, while the current view is displayed, a user input requesting that the history view associated with the current view be displayed.

3. The method of claim 1, further comprising:
    receiving, while displaying a past state of the first application user interface window, a user input requesting that the current view of the first application user interface window be modified according to an earlier version of the displayed past state, the modifying including restoring the lost data.

4. The method of claim 3, further comprising:
    modifying, in response to the user input, the current view of the first application user interface window according to the earlier version.

5. The method of claim 1, where identifying a loss of data comprises:
    comparing current data with previous data.

6. The method of claim 5, where the previous data is associated with a backup.

7. The method of claim 1, where identifying a loss of data comprises:
    monitoring for events indicating data loss.

8. The method of claim 1, where identifying a loss of data comprises:
    examining an application for lost data when the application is opened.

9. The method of claim 1, where generating an alert comprises:
    presenting an alert notification, the alert notification indicating data can have has been lost and where the alert notification provides one or more options for restoring the lost data.

10. A system comprising:
    memory for storing data; and
    one or more processors configured to perform operations comprising:
        displaying a current view of a first application user interface window of a first application, where the current view of the first application user interface window shows a current state of the first application user interface window and includes visual representations of data corresponding to the current state of the first application;
        identifying a loss of data associated with the first application;
        in response to identifying the loss of data, generating an alert identifying the loss of data and prompting a user to initiate a history view to restore the identified lost data;
        receiving user input to initiate the history view;
        displaying a second backup user interface of second backup application, the second backup user interface including at least a first representation of the first application user interface window, where the first representation shows a past state of the first application user interface window and includes visual representations of data from the past state, including a visual representation of the lost data, and wherein the lost data is stored in an archive; and
        receiving input to the first representation of the first application user interface window displayed within the second backup user interface identifying one or more application data items to restore.

11. The system of claim 10, wherein the operations comprise:
    receiving, while the current view is displayed, a user input requesting that the history view associated with the current view be displayed.

12. The system of claim 10, wherein the operations comprise:
    receiving, while displaying a past state of the first application user interface window, a user input requesting that the current view of the first application user interface window be modified according to an earlier version of the displayed past state, the modifying including restoring the lost data.

13. The system of claim 12, wherein the operations comprise:
    modifying, in response to the user input, the current view of the first user interface window according to the earlier version.

14. The system of claim 10, where identifying a loss of data comprises:
    comparing current data with previous data.

15. The system of claim 14, where the previous data is associated with a backup.

16. The system of claim 10, where identifying a loss of data comprises:
    monitoring for events indicating data loss.

17. The system of claim 10, where identifying a loss of data comprises:
    examining an application for lost data when the application is opened.

18. The system of claim 10, where generating an alert comprises:
    presenting an alert notification, the alert notification indicating data has been lost and where the alert notification provides one or more options for restoring the lost data.

19. A non-transitory computer-readable medium storing one or more sequences of instructions which, when executed by one or more processors, cause:
    displaying a current view of a first application user interface window of a first application, where the current view of the first application user interface window shows a current state of the first user interface window and includes visual representations of data corresponding to the current state of the first application;

identifying a loss of data associated with the first application;

in response to identifying the loss of data, generating an alert identifying the loss of data and prompting a user to initiate a history view to restore the identified lost data;

receiving user input to initiate the history view;

displaying a second backup user interface of a second backup application, the second backup user interface including at least a first representation of the first application user interface window, where the first representation shows a past state of the first application user interface window and includes visual representations of data from the past state, including a visual representation of the lost data, and wherein the lost data is stored in an archive; and receiving input to the representation of the first application user interface window displayed within the second backup user interface identifying one or more application data items to restore.

20. The non-transitory computer-readable medium of claim 19, wherein the instructions cause:

receiving, while the current view is displayed, a user input requesting that the history view associated with the current view be displayed.

21. The non-transitory computer-readable medium of claim 19, wherein the instructions cause:

receiving, while displaying a past state of the first user interface window, a user input requesting that the current view of the first user interface window be modified according to an earlier version of the displayed past state, the modifying including restoring the lost data.

22. The non-transitory computer-readable medium of claim 21, wherein the instructions cause:

modifying, in response to the user input, the current view of the first user interface window according to the earlier version.

23. The non-transitory computer-readable medium of claim 19, wherein the instructions that cause identifying a loss of data comprise instructions that cause:

comparing current data with previous data.

24. The non-transitory computer-readable medium of claim 23, where the previous data is associated with a backup.

25. The non-transitory computer-readable medium of claim 19, wherein the instructions that cause identifying a loss of data comprise instructions that cause:

monitoring for events indicating data loss.

26. The non-transitory computer-readable medium of claim 19, wherein the instructions that cause identifying a loss of data comprise instructions that cause:

examining an application for lost data when the application is opened.

27. The non-transitory computer-readable medium of claim 19, wherein the instructions that cause generating an alert comprise instructions that cause:

presenting an alert notification, the alert notification indicating data can have has been lost and where the alert notification provides one or more options for restoring the lost data.

28. A computer-implemented method performed by one or more processors, the method comprising the following operations:

displaying a first user interface window of a first application, where the first user interface window shows a current state of the first application and includes visual representations of data corresponding to the current state of the first application;

receiving user input to invoke a second backup application;

displaying a second backup user interface of the second backup application, the second backup user interface including at least a first representation of the first application user interface window, where the first representation shows a past state of the first application user interface window and includes visual representations of data from the past state, including a visual representation of lost data, and wherein the lost data is stored in an archive; and receiving input to the first representation of the application user interface window displayed within the second backup user interface identifying one or more application data items to restore.

29. The method of claim 28, further comprising:

restoring the one or more identified application data items from the previous state to the current state; and displaying the one or more identified application data items in the first user interface window of the first application.

* * * * *

UNITED STATES PATENT AND TRADEMARK OFFICE
CERTIFICATE OF CORRECTION

| | | |
|---|---|---|
| PATENT NO. | : 9,009,115 B2 | Page 1 of 1 |
| APPLICATION NO. | : 11/499867 | |
| DATED | : April 14, 2015 | |
| INVENTOR(S) | : Pavel Cisler, Robert Ulrich and Dave Lyons | |

It is certified that error appears in the above-identified patent and that said Letters Patent is hereby corrected as shown below:

Title Page, item (56),

In the listing of Other Publications, First Page, column 2, line 1, delete "Wellesly" and insert -- Wellesley --.

In the Claims,

In Claim 9, column 15, line 61, after "data" delete "can have".

In Claim 27, column 18, line 14, after "data" delete "can have".

Signed and Sealed this
Eighteenth Day of August, 2015

Michelle K. Lee
*Director of the United States Patent and Trademark Office*